United States Patent
Weckx et al.

(10) Patent No.: US 10,063,052 B2
(45) Date of Patent: Aug. 28, 2018

(54) METHOD AND SYSTEM FOR DISTRIBUTING AND/OR CONTROLLING AN ENERGY FLOW TAKING INTO ACCOUNT CONSTRAINTS RELATING TO THE ELECTRICITY NETWORK

(71) Applicants: KATHOLIEKE UNIVERSITEIT LEUVEN, Leuven (BE); VITO NV, Mol (BE)

(72) Inventors: Sam Weckx, Assent (BE); Johan Driesen, Heverlee (BE); Reinhilde D'Hulst, Mol (BE); Bert Claessens, Spalbeek (BE)

(73) Assignees: KATHOLIEKE UNIVERSITEIT LEUVEN, Leuven (BE); VITO NV, Mol (BE)

( * ) Notice: Subject to any disclaimer, the term of this patent is extended or adjusted under 35 U.S.C. 154(b) by 499 days.

(21) Appl. No.: 14/433,270

(22) PCT Filed: Oct. 14, 2013

(86) PCT No.: PCT/EP2013/071393
§ 371 (c)(1),
(2) Date: Apr. 2, 2015

(87) PCT Pub. No.: WO2014/057133
PCT Pub. Date: Apr. 17, 2014

(65) Prior Publication Data
US 2015/0280436 A1    Oct. 1, 2015

(30) Foreign Application Priority Data
Oct. 12, 2012  (GB) .................................. 1218342.2

(51) Int. Cl.
H02J 3/14          (2006.01)
G05B 15/02     (2006.01)
(Continued)

(52) U.S. Cl.
CPC ................ *H02J 3/14* (2013.01); *G05B 15/02* (2013.01); *G06Q 50/06* (2013.01); *H02J 3/06* (2013.01);
(Continued)

(58) Field of Classification Search
CPC .. H02J 3/14; H02J 3/06; H02J 13/0079; H02J 3/381; H02J 3/008; G05B 15/02;
(Continued)

(56) References Cited

U.S. PATENT DOCUMENTS 7,231,280 B2 * 6/2007 Costa ........................ H02J 3/14
                                                                307/31
7,231,281 B2 * 6/2007 Costa ........................ H02J 3/14
                                                                307/31
(Continued)

FOREIGN PATENT DOCUMENTS

WO   2011/074950 A2   6/2011
WO   2012/057846 A1   5/2012

OTHER PUBLICATIONS

International Preliminary Report on Patentability (IPRP) dated Apr. 14, 2015, for PCT/EP2013/071393.
(Continued)

*Primary Examiner* — Charles Kasenge
(74) *Attorney, Agent, or Firm* — Bacon & Thomas, PLLC

(57) ABSTRACT

Method and system for distributing and/or controlling an energy flow to a cluster of a plurality of nodes in an electricity network, wherein each node has an associated status, taking into account constraints relating to the energy delivered to the nodes and constraints relating to the electricity network, comprised of:
  allocating a local agent to each node of the cluster of a plurality of nodes, wherein the local agent receives a priority for energy to be delivered;
(Continued)

allocating a regional concentrator agent to the regional network, comprising at least a part of the cluster, wherein a total of the at least one regional network forms the electricity network;

receiving by the at least one regional concentrator agent, the priority for energy to be delivered among the nodes and determining an aggregate priority for energy to be delivered to the at least one regional network, depending on voltage limitations.

16 Claims, 14 Drawing Sheets

(51) Int. Cl.
    *G06Q 50/06*         (2012.01)
    *H02J 3/06*          (2006.01)
    *H02J 13/00*        (2006.01)
    H02J 3/00          (2006.01)
    H02J 3/38          (2006.01)

(52) U.S. Cl.
    CPC ........... *H02J 13/0079* (2013.01); *H02J 3/008* (2013.01); *H02J 3/381* (2013.01); *Y02E 40/72* (2013.01); *Y04S 10/12* (2013.01); *Y04S 50/10* (2013.01)

(58) Field of Classification Search
    CPC ......... G06Q 50/06; Y02E 40/72; Y04S 10/12; Y04S 50/10
    See application file for complete search history.

(56) References Cited

U.S. PATENT DOCUMENTS

| | | | |
|---|---|---|---|
| 9,001,844 B2* | 4/2015 | Vijayasankar | H04L 47/805 370/455 |
| 9,319,238 B2* | 4/2016 | Vijayasankar | H04B 3/542 |
| 2007/0068162 A1* | 3/2007 | Komura | F24D 12/02 60/698 |
| 2009/0058185 A1* | 3/2009 | Schoettle | H02J 3/14 307/35 |
| 2009/0228324 A1 | 9/2009 | Ambrosio et al. | |
| 2012/0323398 A1* | 12/2012 | Boss | H02J 3/14 700/297 |
| 2013/0197706 A1* | 8/2013 | Losee | G06Q 50/06 700/295 |
| 2013/0254615 A1* | 9/2013 | Vijayasankar | H04L 1/0057 714/748 |
| 2013/0266081 A1* | 10/2013 | Pande | H04B 3/54 375/257 |

OTHER PUBLICATIONS

European Office Action dated Mar. 8, 2017, for EP 13786187.8.
International Search Report (ISR) dated Oct. 29, 2014, for PCT/EP2013/071393.
Written Opinion dated Oct. 29, 2014, for PCT/EP2013/071393.
GB Search Report dated Feb. 6, 2013, for GB 1218342.2.
L.C. Rosario et al., "Multi-Agent Load Power Segregation for Electric Vehicles", 2005 IEEE Vehicle Power and Propulsion Conference, Jan. 1, 2005, pp. 91-96.
V. Krishna et al, "Intelligent Agents for Negotiations in Market Games, Part 2: Application", Proceedings of the 20th International Conference on Power Industry Computer Applications, PICA '97, Columbus Ohio, May 11-16, 1997, pp. 394-399.
NERC Transaction Reservationand Scheduling Self Directed Work Team: "Discussion paper on Aligning Transmission Reservations and Energy Schedules to Actual Flows", TRS SDWT Final Report, Nov. 1, 1998, pp. 1-36.

* cited by examiner

METHOD AND SYSTEM FOR DISTRIBUTING AND/OR CONTROLLING AN ENERGY FLOW TAKING INTO ACCOUNT CONSTRAINTS RELATING TO THE ELECTRICITY NETWORK

The present invention relates to a method and system for distributing and/or controlling an energy flow taking into account constraints relating to the electricity network.

TECHNICAL BACKGROUND

In a centralized control scheme, the control of devices is performed centrally: all information and knowledge is present in a central point where all decisions are taken and according commands are sent to the devices/customers.

The main advantage of a central control is that the control can be optimal in the strict sense, all information (including the electricity grid information) required is used at the full extent to allow for the mathematically optimal solution. Diagnostics and error handling can be done in one centralized architecture where all information can be balanced and processed.

However a main disadvantage is the need for information, to allow for a mathematically optimal solution, all relevant information has to be present, this includes the start and stop times of the applications, demand patterns, power profiles and electricity grid topology. Such an information hungry approach necessitates the presence of a robust and extended (meaning expensive) communication network. Consumers participating in this approach have to communicate behaviour patterns (start and stop times) and device profiles, in addition this combination can lead to privacy concerns. Another important disadvantage is the complexity of the calculations, the computational complexity can become insurmountable especially in the case where many devices are present, the calculation requirements sealing exponentially with the number of devices at hand.

To overcome these disadvantages a market-based demand side management system is more preferable. For instance the system disclosed in WO 2011/074950 is a market-based demand side management system as known in the art. The power/energy a device wants to consume or can produce is translated into a bidding function. By combining the bidding functions of all devices taking part in the demand response, a demand-supply balance is found. All devices consume/produce the power that, according to their bidding function, corresponds with the market balance priority. WO'950 provides a robust, simple, generic mechanism where privacy is guaranteed, as the devices only communicate their bidding function.

However, high penetration of wind or solar power challenges the future grid operation. Proper electric system operation requires a way to handle the effects of the variability and randomness of wind or solar power and power of other intermittent sources. When transferring the philosophy of demand side management (DSM) for wind power balancing, one preferably has to match the consumer demand with the power generation, rather than to use expensive reserves of flexible generators. Different electric appliances commonly found in a household can shift their consumption over different time slots. Examples of these flexible devices are refrigerators, air conditioners, dish washers, electric boilers and electric vehicles (EVs). In case of a high excess of wind energy most flexible devices will preferably consume power. This might overload the low voltage network distribution transformer or making it difficult to comply with national standards to keep the voltage within acceptable limits. Simultaneous charging of electric vehicle can create undervoltage problems in low voltage networks. Therefore measures needs to be taken to avoid voltage problems. DSM can also be applied to avoid transformer overloading or voltage profile control in distribution systems. Studies have shown that load response is an effective measure to solve power system constraints in a distribution system with high wind power penetrations. As DSM will involve millions of customers, centralized control will be not manageable as limits of computational complexity and communication overhead will be reached. Different authors therefore propose multi-agent systems to obtain a scalable system. A multi-agent system can be applied to reduce imbalance costs with EVs. A multi-agent based Virtual Power Plant consisting of domestic devices can be created to compensate imbalance caused by wind energy. Reducing peak demand can be obtained with a decentralized control.

Therefore, a need exists for improved methods and systems for distributing and/or controlling an energy flow in an electricity network.

SUMMARY OF THE INVENTION

A need still exists for an improved method and system for distributing and/or controlling an energy flow in an electricity network.

It is an object of the present invention to provide an alternative system and method for distributing and/or controlling an energy flow in an electricity network.

It is another object of the present invention to provide a scalable market control system and method that combines the functionalities of demand side management for wind or solar balancing as well as to help respecting network limitations, for instance like in unbalanced 3-phase 4-wire radial grids. Preferred embodiments of the present invention, propose a market based multi agent demand side management system that preferably take into account voltage, more preferably local voltage, and/or transformer overloading constraints. Advantageously, with measurement data of smart meters at nodes of the electricity network or e.g. a priori obtained data or estimated values regarding the constraints, sufficient grid information can be obtained to enable inclusion of network limitations in a scalable DSM system.

This object is met by the method and device according to the independent claims of the present invention. The dependent claims relate to preferred embodiments.

In a first aspect the invention provides methods for distributing and/or controlling an energy flow to a cluster of a plurality of nodes (N1-N6) in an electricity network (1), wherein each node (N1-N6) has an associated status, taking into account constraints relating to the energy to be delivered to the nodes and taking into account constraints relating to the electricity network (1), comprising the steps of:

i. allocating a local agent (A1-A6) to each node (N1-N6) of the cluster of a plurality of nodes, wherein the local agent receives a priority for energy to be delivered among the nodes (N1-N6);

iii. allocating a regional concentrator agent (RCA1, RCA2) to the least one regional network (2, 3), wherein each regional network (2, 3) comprises at least a part of the cluster and wherein a total of the at least one regional network (2, 3) forms the electricity network (1);

iv. receiving by the at least one regional concentrator agent (RCA1, RCA2), the priority for energy to be delivered among the nodes and determining an aggregate priority for energy to be delivered to the at least one regional network (2, 3), wherein said aggregate priority depends on voltage limitations of the electrical network (1);

In other embodiments the method may further comprise receiving, by a higher-level regional concentrator agent (RCA3), an aggregate priority for energy to be delivered to the at least one regional network and a supply priority for energy to be supplied. Preferably in a following step said higher-level regional concentrator agent (RCA3) may determine an equilibrium priority by intersection of the aggregate priority for energy to be supplied and the supply priority for energy to be supplied. According to preferred embodiments, the method may further comprise receiving the equilibrium priority by a regional concentrator agent (RCA1, RCA2) and preferably receiving said equilibrium priority by a local agent. In other preferred embodiments, when a local agent receives said equilibrium, said local agent may control said node to obey or follow the equilibrium priority, whereby said equilibrium priority depends on voltage limitations of the electricity network and thus a node depends on the limitations of the electricity network.

As a result, in further preferred embodiments of the invention, advantageously voltage constraints of the electricity network may be taken into account when transforming bids, whereby an optimization is performed, which determines what the optimal priority is that needs to be added to each bidding function. Because of this optimization, advantageously it is possible that a 'negative priority' is for instance added to an aggregated priority or a bidding function. This means that to avoid a voltage problem, some consumers are encouraged to consume more.

The proposed multi-agent control according to embodiments of the invention, can comprise three types of agents: local agents, regional concentrator agents and a higher-level regional concentrator agent, e.g. defining an equilibrium priority for energy to be supplied. All nodes, wherein each node can be represented by e.g. a cluster flexible consumer devices, are preferably equipped or allocated with a local agent. Each local agent preferably can define the priority a customer assigns to a certain power consumption level. Priority can therefore for example also be interpreted as a virtual price signal. For instance, for tasks with high priority, a customer is willing to pay more. This results in a bid function which describes the relation between power consumption and priority.

Two common bid functions are shown in FIG. 2. The square bid function is typical for devices that can only be turned on or off, like washing machines, dishwashers or electrical vehicles (EVs) with fixed charging power. The linear bid function can only be used for devices that can modify their power consumption. Depending on the type of charger this might be the case for EVs. The priority is limited by the interval [0, 1]. In alternative embodiments devices with other bidding functions can be used, such as for example non-linear bidding functions. For each time step, when a local agent updates a bid function, depending on the urgency of a task of an agent, if the latter increases, $Bid^{max}$ moves to the right. If in the previous time step power has been consumed, $Bid^{max}$ might move to the left or the bid function will vanish if the task has been completed. In a second step the local agents preferably discretize the bid function and sends it to a regional concentrator agent.

Preferably, the regional concentrator agent may receive an aggregate priority for energy to be supplied to the at least one regional network, whereby said aggregated priority for energy to be supplied, according to embodiments of the invention, can be a sum of the flexibility information of said nodes or e.g. bid functions of all underlying nodes or devices in a low voltage network. A regional concentrator agent in its turn preferably can send the aggregate priority for energy to a higher-level regional concentrator agent (RCA3), as presented in FIGS. 1 and 3.

Advantageously, this reduces significantly the amount of communication required and makes the system scalable, in addition, according to embodiments of the invention restrictions of the electricity network, e.g. voltage constraints, are taken into account.

In an optional next step, according to embodiments of the invention, a higher level regional concentrator agent (RCA3) can define an equilibrium priority, where said equilibrium priority, according to embodiments of the invention, can be constructed by intersection of the aggregated priority for energy to be supplied or e.g. aggregated bid functions and the supply priority for energy to be supplied or e.g. a bid function.

A supply priority e.g. bid function, according to embodiments of the invention, for example can represent virtual prices that a producer or balancing party will accept for different generation levels. When an equilibrium priority is defined, according to embodiments of the invention, this value may preferably been send back to all the local agents that according to embodiments of the invention control and preferably select their corresponding power level. Customers offering flexibility can be reimbursed for the offered flexibility, for the used flexibility and/or by a yearly fixed fee. The way of compensation is out of the scope of this text.

As an advantageous result, embodiments of the present invention, provide added intelligence, preferably taking into account constraints regarding the electricity network e.g. voltage constraints, to a regional concentrator agent. Moreover, systems and methods according embodiments of the invention provide a solution for the shortcomings with respect to electricity network or grid constraints, while not having to deal with the computational complexity and information issues of centrally controlled algorithms.

European low voltage electricity networks typically distribute the electric power with a 3-phase 4-wire system, as a result embodiments of the present invention are described in relation to a European low voltage electricity network, however methods and systems according to embodiments of the present invention can easily be applied to other electricity networks. Typically in Belgium a lot of households are connected by one single phase to the grid. Information about which particular phase a customer is connected to is often not tracked. Identification of the phase of connection is one of the issues system operators are faced with, as unbalanced phase loads result in significant losses, reduced transformer lifetime and problems to keep the voltage within acceptable limits. With the increasing amount of rooftop photovoltaic generators (PV), unbalanced situations will increase. Manual intervention at the household to identify the phase is costly. With the upcoming transition towards a smart grid, low voltage networks will be equipped with automated smart meters that communicate meter readings frequently to the distribution operator. This provides new opportunities for phase identification. For instance a mixed-integer program (MIP) is formed to identify the phase of connection of customers. A MIP however requires branch-and-bound solvers which are not always free available and require significant computation time. A Tabu search method can be used to solve a combinatorial optimization problem. The phase of connection can also be identified by a unique signal injection. However, this would require adapting the smart meter, which might be costly.

Advantageously, according to another embodiment of the present invention, a low complexity method, based on ordinary least-squares is provided for the identification of a phase of connection, whereby said grid information can be used in embodiments of the invention, e.g. when an aggregated priority is determined. Often no grid information is available or accessible in an easy digital structure, as requirements for distribution grids were low in the past. Purpose of a method according to embodiments of the present invention is to identify the influence of flexible loads at one location, on the voltage of another location. The obtained grid information then can be included in a scalable market control system to respect network limitations, for instance in unbalanced 3-phase 4-wire radial grids.

In further preferred embodiments of the invention, a regional concentrator agent preferably may only aggregate or add up powers for a certain possible equilibrium priority if these will not result in violation of network limitations. As a result, advantageously both transformer overloading as under and overvoltage can be taken into account. In case voltage constraints would be violated, nodes and e.g. devices can be treated different, for instance by assigning different priorities to them, but as fair as possible, to comply with the network limitations. In prior art, the main disadvantage is that the electricity grid or network is not taken into account, making it possible that local grid constraints are violated.

In further embodiments of the present invention, a hierarchal tree structure may be provided of three types of agents: local agents, regional concentrator agents and higher-level regional concentrator agents. Devices, in a node, can communicate their willingness to consume/produce energy to regional concentrator agents by means of providing their priority for energy or power to be delivered among the nodes, e.g. by sending a bidding function. A regional concentrator agent, according to embodiments of the invention, may aggregate, e.g. sums up, the bidding functions of all underlying nodes or devices and may provide a priority for distributing energy. A regional concentrator agent, according to embodiments of the invention, preferably may only add up powers for a certain priority if these will not result in violation of electricity grid limitations, such as for example transformer overloading, under and/or overvoltage, etc. In case grid constraints would be violated, different priorities may preferably be assigned to the different devices, to comply with the network limitations. In order to know the impact of the power of a certain node or device on the network voltage constraints, the regional concentrator agent preferably may have some information available on the grid topology, in preferred embodiments a minimal requirement is a voltage measurement at the grid connection of the devices or nodes or a voltage identification for instance using a LS-methodology according to embodiments of the invention.

In further alternative embodiments, a voltage, used as a network constraints, can be estimated with techniques known in the art, e.g. state estimations, the estimated voltage can then be preferably used with or without a safety margin included in the estimation. In other embodiments a voltage measurement of a "problem node" may also suffice. A regional concentrator agent, according to embodiments of the invention, on their turn preferably may send an aggregated priority to distribute an energy flow to a higher-level regional concentrator agent. Preferably said higher-level regional concentrator may receive said aggregated priority without any knowledge regarding the changes or amendments a regional concentrator agent has performed in function of the electricity network constraints.

In a further embodiment, one or more of the local agents, regional agents and the higher-order regional agent can be implemented as an autonomous unit. The agent is then an autonomous unit which is autonomously capable of receiving or sending out priorities, independently from the other agents in the same or in a different layer in the electricity network.

A higher-level regional concentrator agent, according to embodiments of the invention, may preferably define an equilibrium priority as an intersection of the aggregated flexibility information for distributing energy, according to embodiments of the invention and the supply bid functions. When an equilibrium priority is defined, this value may preferably been sent back to all the local agents, that preferably control or select their corresponding power level. Preferably, said equilibrium priority is equal for al nodes or devices. If there is a problem in the electricity network (e.g. an overvoltage or under voltage and/or overload) which is incorporated by a regional concentrator agent according to embodiments of the invention, the regional concentrator agent can provide an additional priority, which can be added or subtracted to the aggregated priority, before for instance sending the aggregated priority to a local agent.

Embodiments of the present invention can be used for smart grid demand side management applications, e.g. the charging of electric vehicles, balancing day ahead mismatches on a day ahead market, scheduling domestic appliances for peak shaving or optimal use of locally supplied renewable energy.

Embodiments of the present invention, advantageously may provide a layered model with separate agents, as a result less data exchange is required between the different layers. This also opens up the possibility of an increased efficiency in the performance. The agent may, for example, be implemented as a (software) entity with input and output and with a defined purpose. An agent can look after the interests of a user, a component or entity in embodiments of the present method. The regional networks and the associated regional agents may also be layered together, as a result of which a network structure is created with an in fact unlimited number of layers. A model of this type can also be referred to as a "multi-agent system", i.e. a system with more than one agent, wherein agents can or must negotiate or collaborate with one another.

In a further embodiment, the method further can comprise an iterative performance of determinations of priority for energy or power to be delivered among by the local agents, the regional agents, and the higher-order regional agent. The iterative approach to a solution of the different priority determinations advantageously will result in a better and faster solution, i.e. with a lower error margin.

In a further embodiment, the priority determinations by two or more of the local agents, regional agents and the higher-order regional agent can be carried out in parallel. This delivers a saving on the time required to carry out priority determination.

In a further embodiment, a higher-order regional agent periodically can carry out the equilibrium priority determination. This results in a predictable behaviour of the method, which may be advantageous if the results of the status determinations are further used in other measurements or simulations.

In preferred embodiments voltage of nodes, more preferably a complex voltage, can be measured and/or estimated and communicated, whereby said, voltage or load of nodes can vary. When introducing voltage constraints, according to embodiments of the invention, a safety margin may be included for voltage or for overloading of the electricity network. Advantageously, if problems would occur regarding overloading of the electricity network, embodiments of the invention provide means and time to adapt accordingly.

Advantageously, embodiments of the invention may provide a generic way of transforming bids by e.g. adding an appropriate priority which is not limited to non-circular networks, all types of networks are possible. A transformation, according to embodiments of the invention, may preferably be performed every time a priority or an aggregated priority is sent to a higher level of the tree structured network by allocated agents. These agents may preferably have information on that specific part of the network and may transform the priorities accordingly, before sending it up to the next layer.

In further preferred embodiments the present invention may provide a method for distributing and/or controlling an energy flow according wherein the method further comprises receiving, by a higher-level regional concentrator agent (RCA3), the aggregate priority for energy to be delivered to the at least one regional network and a supply priority for energy to be supplied.

In other preferred embodiments the present invention provides a method for distributing and/or controlling an energy flow according wherein the method further comprises determining an equilibrium priority, by intersection of the aggregate priority for energy to be supplied and the supply priority for energy to be supplied by the market, by the higher-level regional concentrator agent (RCA3). Preferably, the method further may comprise receiving the equilibrium priority by a regional concentrator agent (RCA1, RCA2).

In other preferred embodiments the present invention may provide a method for distributing and/or controlling an energy flow wherein the method further may comprise receiving said equilibrium priority by the local agent, whereby said local agent controls a power consumption and/or distribution of the node. Preferably said controlling a power consumption and/or distribution of the node may comprise assigning an amended priority for said node, based on the equilibrium priority.

In preferred embodiments of the present invention the associated status of each node may comprise a complex voltage, an incoming and/or outcoming power.

In other preferred embodiments of the present invention the associated status may provide voltage limitations of the electricity network (1).

In other preferred embodiments the associated status may be measured and/or a priori available and/or estimated. In other preferred embodiments of the invention a complex voltage may comprise a phase and wherein said phase of a connection with the electricity network (1) is identified by a least-squares approach.

Still other preferred embodiments of the invention provide a method for distributing and/or controlling an energy flow wherein the method further may comprise the step of identifying influence of flexible loads at one location on the electricity network (1), on the voltage of another location on the electricity network (1). In other preferred embodiments of the invention the priority for energy to be delivered may describe a relation between power consumption of a node and priority.

In still other preferred embodiments of the invention a priority for energy or power to be delivered to be supplied may be determined as power in function of priority such that minimal priority corresponds to the maximum amount of power intake allowed by the respective device and the maximal priority corresponds to the minimum amount of power intake allowed by the respective device, the relation between power and priority being indicative of the minimal amount of energy needed by the device in the predetermined amount of time and the relation between power and priority changing in function of time.

In still other alternative embodiments of the invention a method may be provided for distributing and/or distributing an energy flow according, the method further comprising the steps of aggregating flexibility information for the cluster by gathering flexibility information of the respective nodes in the cluster, the flexibility information of the respective nodes comprising information on the energy already available to the respective devices, the minimal amount of accumulated energy in function of time needed and the maximal amount of accumulated energy allowed by the respective nodes of the cluster within the predetermined period of time in function of time and the minimal and maximal amount of power intake allowed by the devices, and combining the gathered flexibility information of the respective nodes of the cluster into aggregate flexibility information for the cluster, the aggregate flexibility information of the cluster comprising information on the energy already available to the cluster, the minimal amount of accumulated energy in function of time needed and the maximal amount of accumulated energy in function of time allowed by the cluster, taking into account the minimal amount of accumulated energy in function of time needed and the maximal amount of accumulated energy in function of time allowed by the at least one node within the predetermined period of time in function of time, within the predetermined period of time in function of time and on the minimal and maximal amount of power intake allowed by the cluster in function of time, taking into account the minimal and maximal amount of power intake allowed by the nodes determining accumulated energy to be delivered to the cluster in function of time over the predetermined period of time taking into account the aggregate flexibility information for the cluster, supplying the determined accumulated energy to the cluster by obtaining, from the flow of energy, power to be supplied to the cluster in function of time based on the determined accumulated energy to be delivered in function of time, determining for all devices in the cluster a priority for power to be supplied.

Embodiments of the invention, advantageously may provide, a distributed control concept which provides a scalable, private, more secure, low bandwidth and little central processing power solutions for the current and future challenges of the electricity network.

In a second aspect the invention provides systems for distributing and/or controlling an energy flow to a cluster of a plurality of nodes (N1-N6) in an electricity network (1), wherein each node (N1-N6) has an associated status, taking into account constraints relating to the energy to be delivered to the nodes and taking into account constraints relating to the electricity network (1), wherein the system comprises a local agent (A1-A6) and a regional concentrator agent (RCA1, RCA2) adapted to perform the method according to embodiments of the invention.

In preferred embodiments a system for distributing and/controlling an energy flow to a cluster of a plurality of nodes in an electricity network may further be provided with an interface to receive measurement data.

In other preferred embodiments, a system for distributing and/or controlling an energy flow to a cluster of a plurality of nodes in an electricity network may be part of a node (N1-N6) in the electricity network (1).

The present invention may relate to an energy flow distribution device to carry out energy flow distribution on an electricity network, wherein the device comprises one or more computer systems, and the one or more computer systems are designed to implement one or more of a local agent, regional agents and a higher-order regional agent, as a result of which the device obtains the functionality of the method according to one of the present embodiments, as described above. A distribution device of this type can, for example, be used advantageously by a network manager, both to monitor an electricity network and to perform simulations of an electricity network.

In one embodiment, the device may be further provided with an interface to receive measurement data from sensors. Up-to-date measurement data can thus be included in the distributions. In a further embodiment, the device may be a part of a node in the electricity network, for example in the form of an embedded system.

In a third aspect, the present invention provides computer program products for, if implemented on a control unit, performing a method according to the first aspect of the present invention, or a combination of these.

According to an exemplary embodiment of the present invention, there may be provided a program storage device readable by machine, tangibly embodying a program of instructions executable by the machine to perform method steps for providing automatic diagnosis and decision support.

In a fourth aspect, the present invention provides data carriers storing a computer program product according to the third aspect of the present invention. The term "data carrier" is equal to the terms "carrier medium" or "computer readable medium", and refers to any medium that participates in providing instructions to a processor for execution. Such a medium may take many forms, including but not limited to, non-volatile media, volatile media, and transmission media. Non-volatile media include, for example, optical or magnetic disks, such as a storage device which is part of mass storage. Volatile media include dynamic memory such as RAM. Common forms of computer readable media include, for example, a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read. Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN or the internet. Transmission media can take the form of acoustic or light waves, such as those generated during radio wave and infrared data communications. Transmission media include coaxial cables, copper wire and fiber optics, including the wires that form a bus within a computer.

In an fifth aspect, the present invention provides transmission of a computer program product according to the third aspect of the present invention over a network.

BRIEF DESCRIPTION OF THE DRAWINGS

Further features of the present invention will become apparent from the examples and figures, wherein.

DEFINITIONS

The term "flexibility information" used in this text relates to a use of power or energy in function of time, e.g. flexibility information of a device.

The term "bid or bidding function" used in the text relates to a power or energy a device wants to consume or can produce in function of the priority, e.g. each device can define a priority a consumer assigns to a certain power consumption level. A bid function describes a relation between power consumption and priority and provides a priority for distributing an energy flow. A bid or bidding function, thus can be represented as an amount of power [W] to be traded as function of a virtual price [€/W]. Evidently, a trader who is selling power will send an increasing function, while someone interested in buying power, will send a decreasing function. For every hour such a bidding function can be sent, so that different amounts can be traded during the day.

Figure 3:
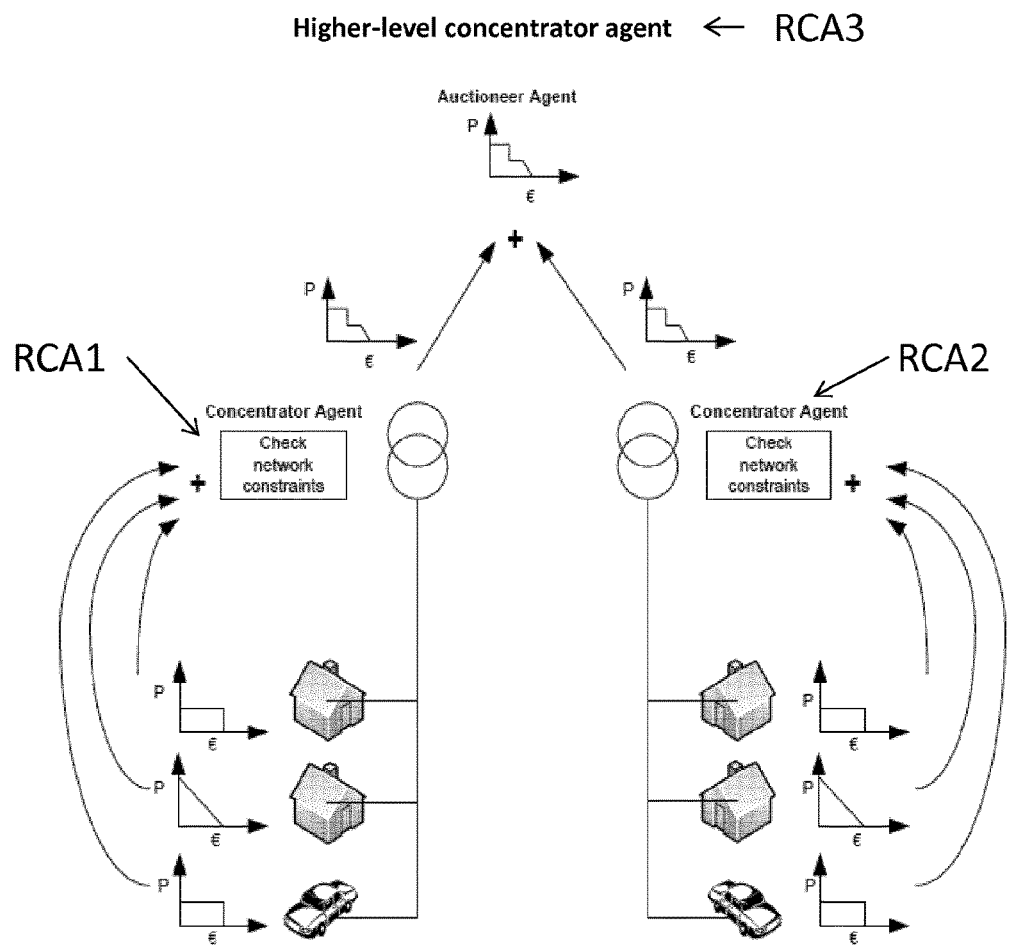
FIG. 3 schematically illustrates a market based method for distributing or controlling an energy flow in an electric network according to embodiments of the invention.

The term "higher-level regional concentrator agent" can be used interchangeably in the text and the claims with the term "auctioneer agent" as shown in FIG. 3.

Figure 13:
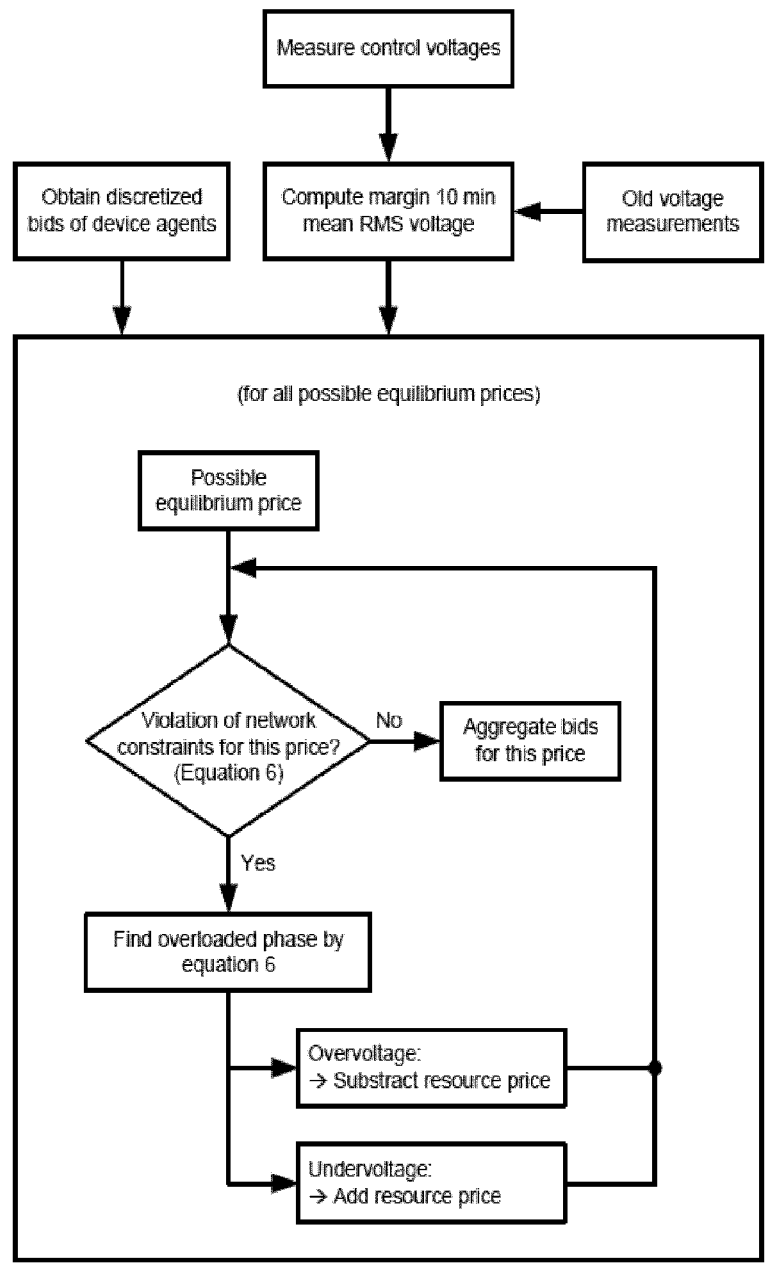
FIG. 13 illustrates a flow chart representing a method according to embodiments of the invention, which includes network constraints in the concentrator agent.

The term "aggregated priority" can refer to a bidding function so that the term "aggregated priority" can be used interchangeably with the term "aggregated bids", e.g. as in FIG. 13.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the drawings, like reference numerals indicate like features; and, a reference numeral appearing in more than one figure refers to the same element. The drawings and the following detailed descriptions show specific embodiments of the device and methods for distributing an energy flow taking into account constraints relating to the electricity network.

By way of illustration, embodiments of the present invention not being limited thereto, further examples of a method and system according to embodiments of the present invention are described and experimental results are discussed below.

Figure 1:
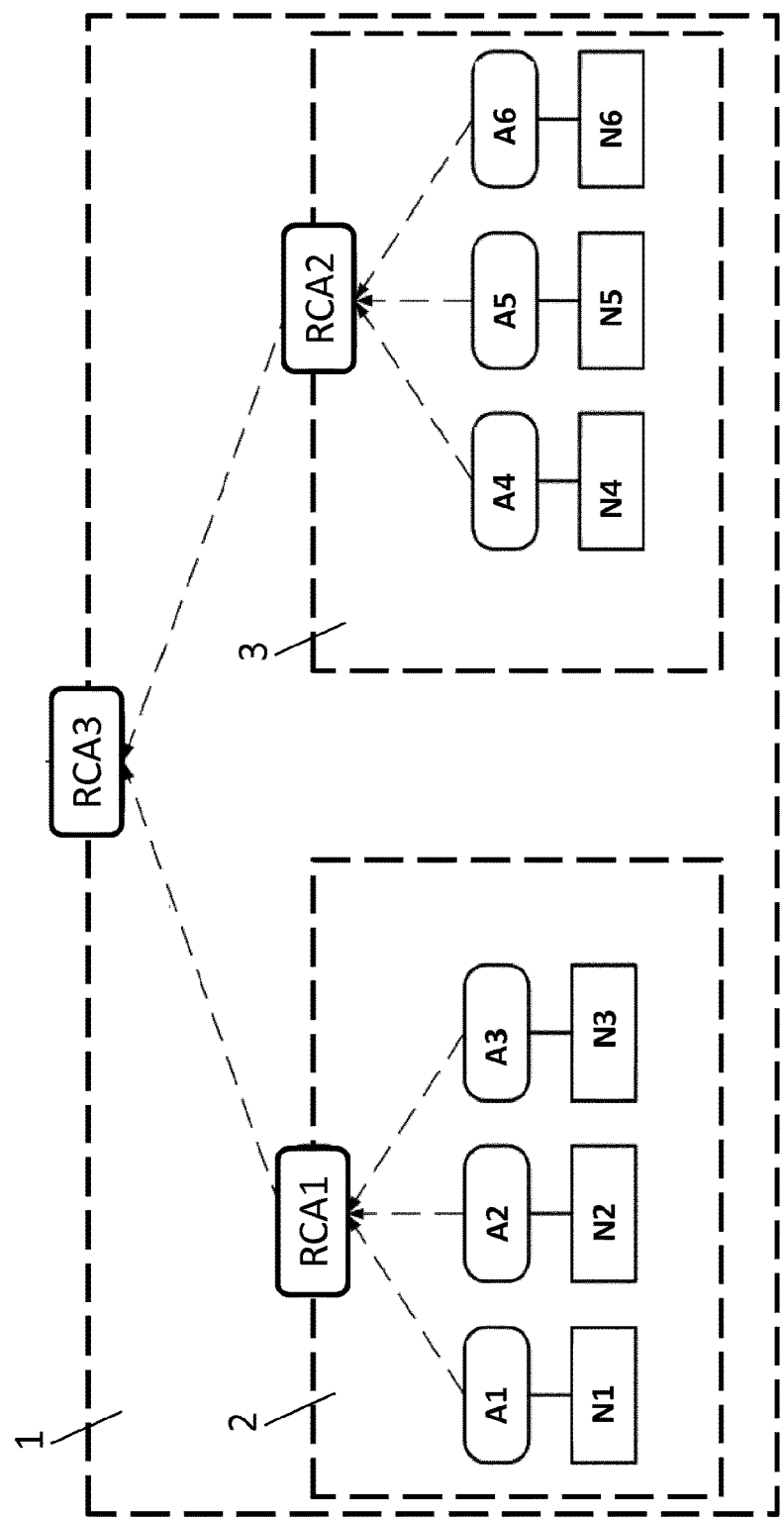
FIG. 1 schematically illustrates a method for distributing or controlling an energy flow according to embodiments of the invention.

FIG. 1 illustrates a possible arrangement of an electricity network in which the energy flow is distributed or controlled according to one of the methods of the present invention. According to this arrangement, the electricity network 1 comprises a plurality of nodes (N1, N2, . . . ), each node having an associated status (e.g. a complex voltage, an incoming and/or an outgoing power, etc.). A local agent (A1, A2, . . . ) is associated to each of the nodes. The plurality of nodes may be grouped in one or more regional networks (1, 2, . . . ) and a regional concentrator (RCA1, RCA2, . . . ) is provided for each regional network. A regional concentrator agent (RCA3) is provided for the regional networks.

Embodiments of the present invention, provide a market based control of an electricity network, whereby each possible equilibrium priority can result in a control of a consumption level of each device or node defined by a priority or by e.g. bid function. To include the voltage limitations of the network in the concentrator agent, according to preferred embodiments of the invention, for each possible equilibrium priority preferably a linearized load flow is executed, before sending it to a higher-level regional concentrator agent or auctioneer agent. If no voltage constraint violations occur, the different priorities e.g. bids can be aggregated, providing an aggregated priority, e.g. added up for this possible equilibrium priority by the concentrator agent. Preferably, each node preferably in a next step gets the same priority assigned. This can be done by checking the following conditions:

$$\sum_{i=1}^{n} \frac{\partial V^m}{\partial P_i}(P_i(\overline{\lambda})) < V_{lim}^m \qquad \text{Eq. 1}$$

$$\sum_{i=1}^{n} (P_i(\overline{\lambda})) < P_{lim}^{Trafo}$$

Where $\overline{\lambda}$ is the possible equilibrium priority, and $$\frac{\partial V^m}{\partial P_i}$$

is the influence of power $P_i$ injected at the point of connection to the grid of a device i, on the voltage of all nodes m that are kept in limits. Typically these nodes m are all the customer nodes. It is assumed that these nodes communicate their voltages to the regional concentrator agent, so that the margin to the phase voltage limit ($V_{lim}^m$) at all control nodes m when no flexible devices are turned on can be defined. $V_{lim}^m$ is therefore a vector of size (3×m)×1. $P_i(\overline{\lambda})$ is the power that a flexible device i consumes for a given equilibrium priority $\overline{\lambda}$, defined by a bid function. $P_{lim}^{Trafo}$ is the flexible power that can be consumed before the transformer gets overloaded.

When violations of Eq. 1 do take place, the assigned priority to each device, according to embodiments of the invention, can be modified to comply with the voltage limitations. The average or aggregated assigned priority is preferably kept equal to the possible equilibrium priority. The influence of each device on the voltage can depend on the location and/or the phase of connection, therefore according to embodiments of the invention assigning different priorities to different devices preferably can help to remain in voltage limits. A regional concentrator agent, according to embodiments of the invention, preferably aggregates, e.g. adds up, the powers that go together with the different priorities for this equilibrium priority. The different priorities are preferably stored, so that in case this equilibrium priority is selected by the higher-order regional concentrator agent, the correct priorities can be send to the different local agents.

Social fairness requires that all customers get an as equal as possible priority. Therefore when assigning different priorities according to embodiments of the invention, the difference between these should be kept as small as possible. This results in a mixed integer optimization problem, when e.g. square bid functions are used for each possible equilibrium priority point that does not comply with voltage limitations, moreover for each possible equilibrium priority with grid constraints or violations, an optimization problem is solved e.g. for square bid functions:

$$\underset{\lambda,x}{\text{minimize}} \quad \|\bar{\lambda} - \lambda_i\|_{1,2,\infty} \qquad \text{Eq. 2}$$

$$\text{subject to} \quad \frac{1}{n}\sum_{i=1}^{n} \lambda_i = \bar{\lambda}$$

$$(-1 + Bid_i^{max})x_i + 1 > \lambda_i$$

$$(-x_i + 1)Bid_i^{max} < \lambda_i$$

$$\sum_{i=1}^{n} \frac{\partial V^m}{\partial P_i}(P_i^{max} \cdot x_i) < V_{lim}^m$$

$$\sum_{i=1}^{n} (P_i^{max} \cdot x_i) < P_{lim}^{Trafo}$$

$$x \in 0, 1;$$

Figure 2:
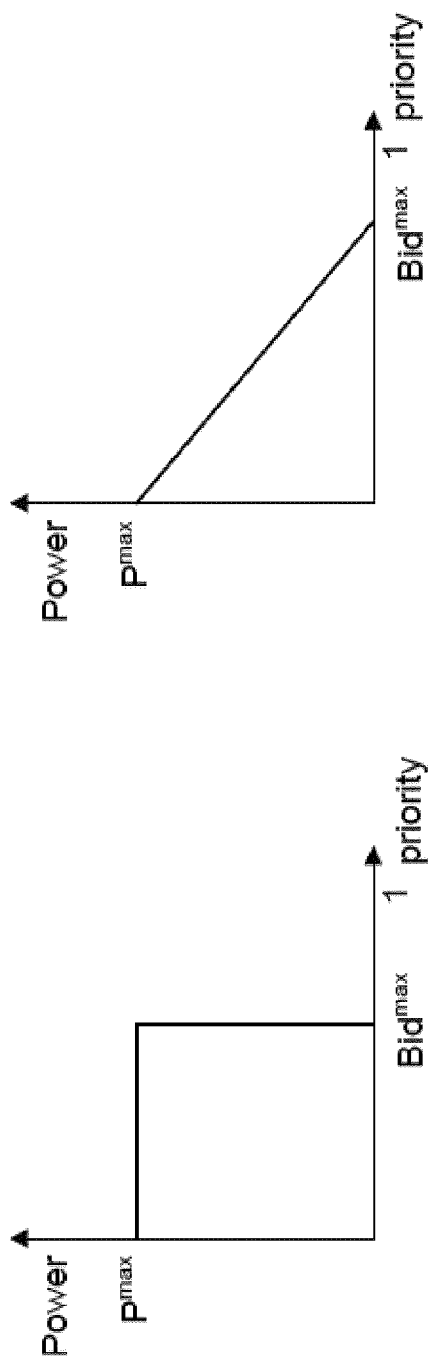
FIG. 2 illustrates on a square bid function (left) and a linear bid function (right) for flexible devices and electrical vehicles (EV).

$\lambda_i$ is the priority assigned to device i out of n devices, whereby said device may be connected to a node, or where $\lambda_i$ is the priority assigned to node i out of n nodes, $x_i$, is an integer variable that defines if device i (or node i) will be on or off for the selected priority $\lambda_i$. $Bid_i^{max}$ is the maximal priority for which the device is on like in FIG. 2 and $P_i^{max}$ is the power it consumes then. The objective function of the optimization problem of Eq. 2 minimizes the difference between the equilibrium priority and the individual priorities. Both 1-, 2- and ∞-norm can be selected. The first constraints specifies that the average priority preferably is equal to the equilibrium priority. The second and third constraint state when a device is on, specified by the variable $x_i$, and limits the priority between 0 and 1. The fourth constraint expresses the voltage constraints. The fifth constraint avoids transformer overloading. The combined influence on the voltage of all devices should remain smaller than the margin left without assigned power. This integer optimization problem can be easily solved with CPLEX optimizer by IBM. In case the optimization problem is not feasible for a certain equilibrium priority, the nearest equilibrium priority with a feasible solution is preferably passed on.

As a result, advantageously, a priority for distributing an energy flow is preferably defined as an optimization variable. In addition, different optimization formulations can be possible, for instance as social fair as possible. Preferably easy bid functions are used or e.g. conservative approximations for any convex shaped bid function.

A similar optimization problem can be formulated for linear bids:

$$\underset{\lambda,x}{\text{minimize}} \quad \|\bar{\lambda} - \lambda_i\|_{1,2,\infty} \qquad \text{Eq. 3}$$

$$\text{subject to} \quad \frac{1}{n}\sum_{i=1}^{n} \lambda_i = \bar{\lambda}$$

$$0 < \lambda_i < 1$$

$$\sum_{i=1}^{n} \frac{\partial V^m}{\partial P_i} \max\left(P_i^{max} - \frac{dP_i}{d\lambda_i}\lambda_i, 0\right) < V_{lim}^m$$

$$\sum_{i=1}^{n} \max\left(P_i^{max} - \frac{dP_i}{d\lambda_i}\lambda_i, 0\right) < P_{lim}^{Trafo}$$

This optimization problem e.g. is non-convex due to some partial derivatives being negative. It can be easily solved with the CPLEX optimizer by IBM. By combining the constraints of problems stated in Eq. 2 and Eq. 3, an optimization problem that combines both types of bids can be formulated. This is for the ease of notation not done in this application, but could be easily done by a person skilled in the art.

When all the priorities or e.g. bid functions are assembled respecting the network constraints, the aggregated priority or aggregated bid function determined by a regional concentrator agent, is sent to the higher-level regional concentrator agent according to embodiments of the invention. This agent preferably identifies an equilibrium priority and communicates this back to the regional concentrator agent. The regional concentrator agent preferably sends out the corresponding priorities to each node or each device. In case an optimization problem had to be solved for this equilibrium priority, the priorities of all devices in a node will differ.

Figure 4:
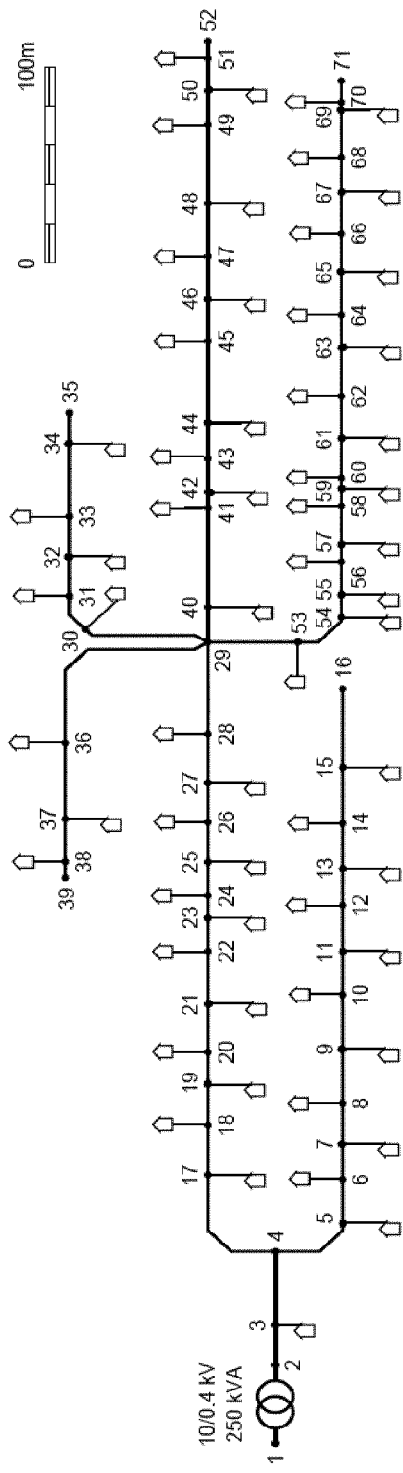
FIG. 4 illustrates a network used in simulations according to embodiments of the invention, all lengths are drawn on scale.

The network used in the simulations as described above preferably is a 3-phase, 4 wire radial system with a TT earthing for residential customers provided by a Belgian DSO. The network consists of 62 customers (as illustrated in FIG. 4). All customers are considered to be connected single phase to the network. A database of 100 residential load profiles is available to perform load flow simulations. Preferably such load profiles are assigned randomly to households. All loads (including the flexible loads) are considered as PQ sources, making the active and reactive power independent of the local voltage. The connection between the feeder and the customer is included and consists of a 15 meter long copper cable with a cross section of 16 mm².

The problems described in Eqs. 1, 2 and 3 preferably require that a partial derivative, $$\frac{\partial V^m}{\partial P_i},$$

which provides an influence of power $P_i$ injected by a flexible device connected at node i, on the voltage $V^m$ of a node m that is kept in limits. This partial derivative can be obtained by numerical differentiation. This preferably requires two load flows for each location that makes a bid each time step. To lower computational burden, the partial derivatives can be obtained by a linear regression as a function of the measured phase voltage, or kept constant. In case the loads would be modeled as current sources the system would behave linearly and the partial derivatives $$\frac{\partial V^m}{\partial I_i}$$

would be constant due to the superposition principle.

Figure 5:
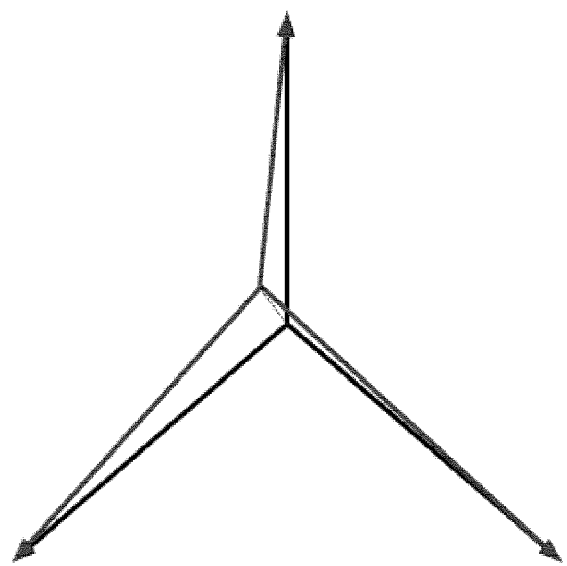
FIG. 5 illustrates a neutral point shift in unbalanced grids.
Figure 10:
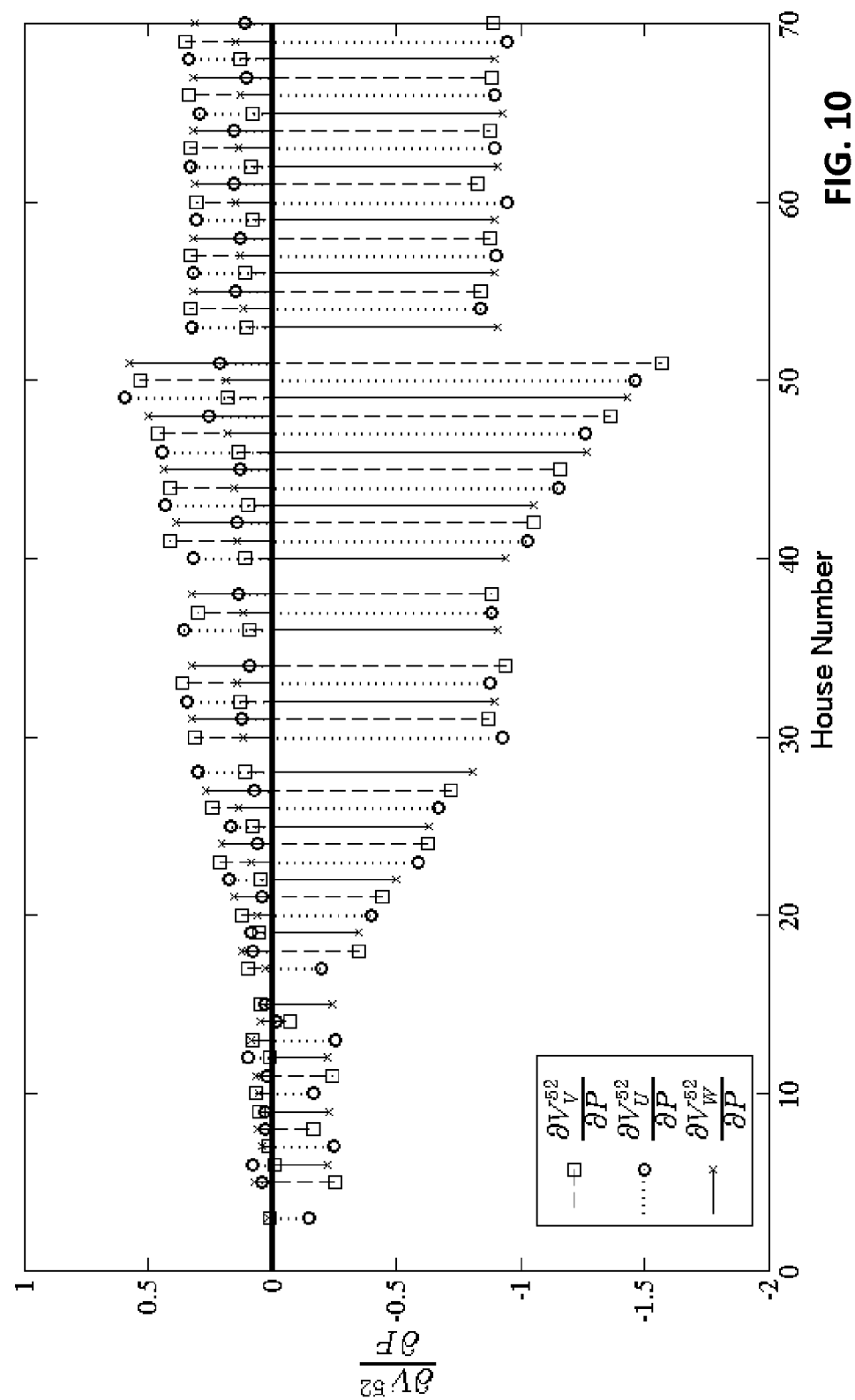
FIG. 10 illustrates the influence of loads of all houses on the phase voltages of node 52.

A remarkable effect in unbalanced 3-phase, 4 wire radial systems is the neutral point shift. In case of unbalanced or single phase loads, a current will flow through the neutral conductor, resulting in a voltage drop over its impedance. This can shift the neutral voltage experienced by all customers as shown in FIG. 5 (this is also illustrated in FIG. 10 for a complex voltage). Therefore, when consuming power in one phase, the voltage in this phase decreases, whereas the voltage in the other two phases can slightly increase. In case voltage limitations are reached in one phase, more power consumption in the other two phases can allow a higher consumption in the critical phase. This effect results in negative signs of partial derivatives $$\frac{\partial V^m}{\partial P_i}$$

in case power is injected at another phase than the considered phase voltage $V^m$ of node m.

Figure 6:
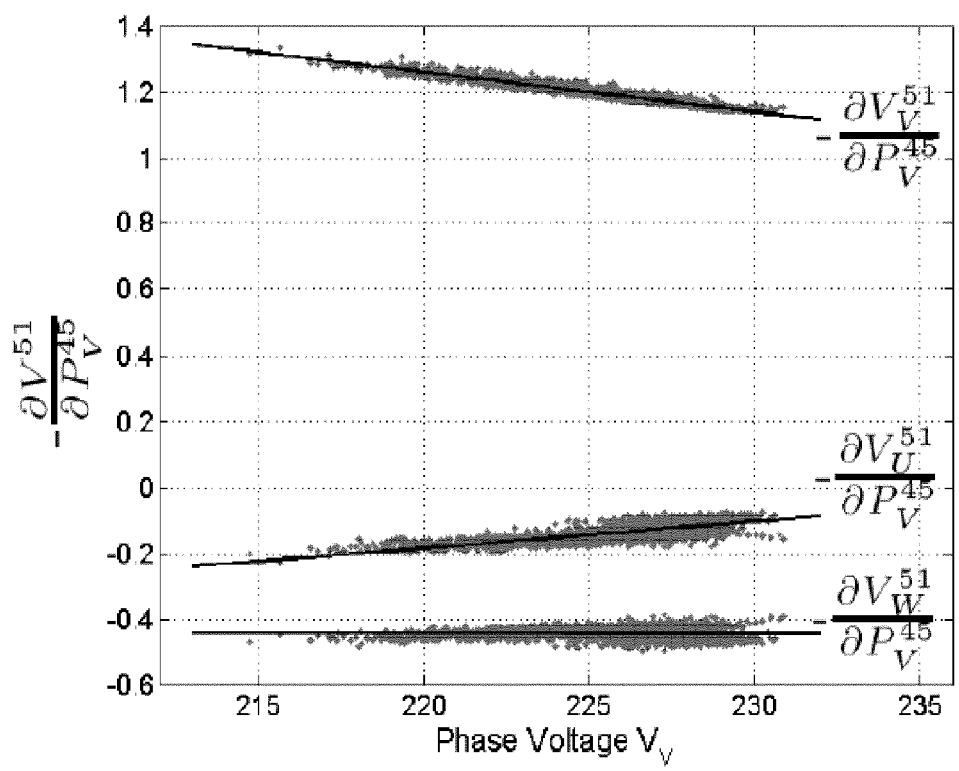
FIG. 6 illustrates the influence of a flexible device on the phase voltages at the end of the feeder.

FIG. 6 shows the influence of a power injection of a flexible device connected at phase V in node 45, on the phase voltages of node 51 obtained by numerical differentiation for a 1 month simulation. Power injection in one phase can result in a voltage drop in the same phase, whereas the voltage will slightly rise in the other two phases. For example, a linear regression is a good approximation of these partial derivatives.

A. An Aggregated Priority Determined by a Regional Concentrator Agent According to Embodiments of the Invention An example of an aggregated bid function, determined by a regional concentrator agent, respecting the network constraints, is presented in FIG. 7. It typically can consist of 3 zones. For high priorities a small amount of power will be consumed, resulting in no undervoltage conditions, marked with the number 3 on FIG. 7. When priorities are lowered, power consumption of flexible devices increases and voltage violations can occur when the same priority is assigned to each device. Therefore different priorities are preferably assigned to all devices in this zone, marked with the number 2. The aggregated or summed power can be both lower as higher than the aggregated or summed power when no network constraints are incorporated. The higher aggregated or summed power is due to the neutral point shift. In case one phase is reaching its voltage limits, consuming power in the other phases is necessary to comply with the voltage regulation. For average priorities close to zero, the zone marked by number 1, there is often no feasible solution, as it is impossible to have an average priority close to zero respecting the network constraints. For these points the last feasible point of zone number 2 is preferably passed on to the aggregator agent. The maximal flexible power available for wind power balancing is significantly higher when it is allowed to assign different priorities to different customers.

Figure 9:
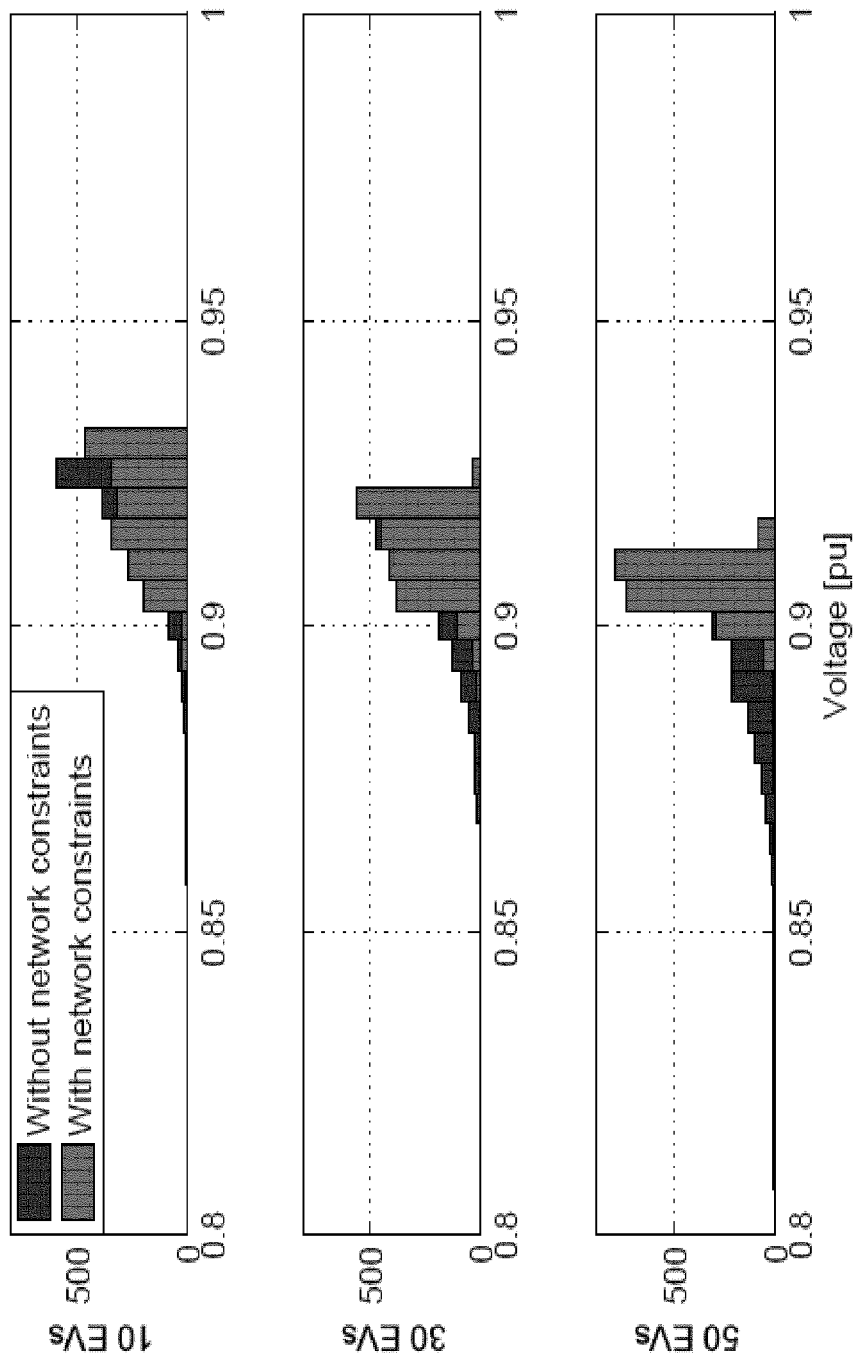
FIG. 9 illustrates the minimum voltage for market based control with and without network constraints.

B. Example of an Application of Embodiments of the Present Invention to Charging of a Vehicle Fleet for Wind Power Balancing An algorithm, according to embodiments of methods of the present invention, is tested in simulation where a vehicle fleet is used for wind power balancing. For different penetration levels of EV in the network of FIG. 4, an algorithm is applied. For each penetration level a certain amount of cars are randomly distributed over the grid and assumed to have a single-phase connection. Based on their arrival and departure time, each local agent creates a priority for delivering or consuming energy e.g. a bid function for the EV. Each quarter for instance, priorities (e.g. bid functions) are updated. When aggregating these priorities e.g. bids, the regional concentrator agent takes the network constraints into account by for instance solving optimization problem described in Eq. 2 or Eq. 3 if undervoltage would occur. Voltage conditions are preferably checked in all nodes. The partial derivatives used in these simulations are preferably based on numerical differentiation. The regional concentrator agent preferably sends the aggregated or summed power curve to the higher-level regional concentrator agent. The balancing party wants the fleet to consume a certain amount of energy dependent on the wind energy excess. In the higher-level regional concentrator agent, the equilibrium priority is preferably found as the intersection of the assembled power or bid curve and the expected energy consumption of the balancing party 7. As cars with high priority will be charged first, energy flexibility is preferably maintained for subsequent time-steps. FIG. 9 compares the proposed algorithm, with a market based control that does not take into account the network limitations, for different penetration levels of EV. The undervoltage limit is defined to be 0.9 pu. 50 simulations of 1 month are run for each of the three penetration levels with different random assignment of load profiles and EV location. The amount of power that preferably is balanced can be variable and depends on the penetration level. The 2000 lowest voltages in the grid are shown for each penetration level in this figure. It can be seen that violations of the grid standards takes less place when network constraints are included in the market based control. Small undervoltage can still occur even when the network constraints are taken into account. Multiple reasons can be given for this effect. First of all undervoltage can occur even without one car charging. An algorithm, according to embodiments of the invention, cannot avoid these conditions, but can only avoid worsening it. Secondly linearization errors are made in 1. Finally, cars that assign a priority of 1, which is a maximal priority, to charging, will be charged no matter what. This might violate the voltage limitations, but can advantageously guarantee all cars being charged on time.

C. Computation Time

Computation time is critical for a quasi real-time implementation of the algorithm. Different measures can be taken to limit computation time. First of all the amount of discretization steps of the bid functions defines the required amount of computation as well as communication between agents. Besides that, applying linear regression to calculate the required partial derivatives of Eqs. 1, 2 and 3 reduces computational effort and makes the optimization problem dominate the computation time, as the time required for checking condition of Eq. 1 is negligible. Alternatively, the partial derivatives could be kept constant, resulting in higher linearization errors.

The time to solve the optimization problems described in Eqs. 2 and 3 with 1-norm on a Quad core 3.00 GHz pc with CPLEX for a certain amount of EVs is presented in Table I, more specifically Table I illustrates maximum and average optimization time as a function of the type of bid.

TABLE I

| | Square bids | | Linear bids | |
|---|---|---|---|---|
| | Time$_{max}$ | Time$_{avg}$ | Time$_{max}$ | Time$_{avg}$ |
| 10 EVs | 0.585 s | 0.423 s | 0.855 s | 0.707 s |
| 30 EVs | 1.019 s | 0.441 s | 1.691 s | 1.161 s |
| 50 EVs | 0.947 s | 0.478 s | 2.396 s | 1.753 s |

Figure 7:
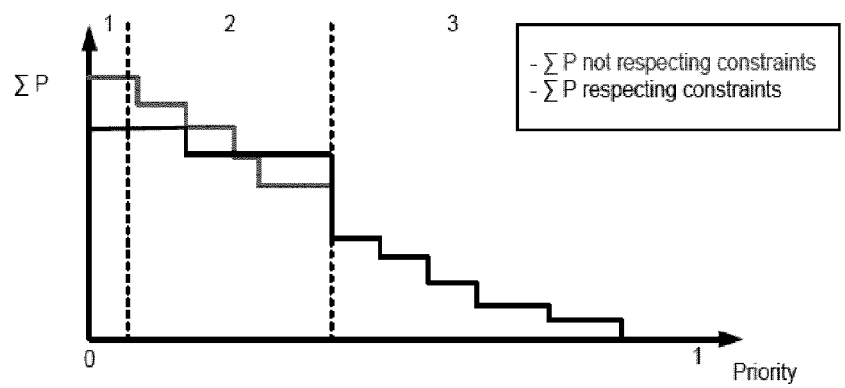
FIG. 7 illustrates summed bid functions respecting network constraints according to embodiments of the invention.
Figure 8:
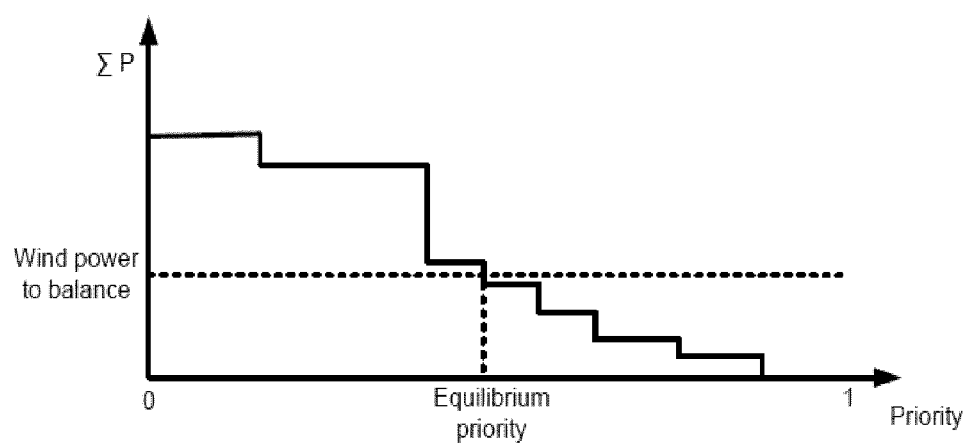
FIG. 8 illustrates defining of an equilibrium priority by a higher-level regional concentrator agent.

Each aggregation of priorities (e.g. bid functions, which for example are square or linear in Table I) preferably requires these optimization problems to be solved multiple times for all different possible equilibrium priorities that fall in zone 2 of FIG. 7. Typically this zone is small, as undervoltage problems only occur for high charging powers. Finally the optimization problems preferably can be solved in parallel to increase the processing speed of the concentrator agent. This allows us to think that a concentrator agent can aggregate the priorities (e.g. bids) in less than 10 seconds and that the proposed algorithm can be applied in the future to incorporate network constraints in a multi-agent demand side system.

Preferred embodiments of the present invention provide systems and methods for a multi-agent market based control, which can take network limitations into account. The system is scalable and can be applied to aggregate flexible customer devices in low voltage grids to balance wind power variations. Flexible devices that have higher needs for electricity, and therefore are willing to pay more than others, preferably can receive first the available power. In case no network limitations are active, all devices are preferably equally treated. When voltage problems might occur in the low voltage grid, devices are preferably treated differently, in embodiments of the invention, preferably dependent on their phase of connection and/or location in the grid, but in an as fair as possible way. This way voltage problems can be avoided and more power can be aggregated. When an algorithm, according to embodiments of methods of the invention, is applied for example balancing wind power with a fleet of EVs, it is shown that undervoltage and transformer overloading advantageously can be avoided, without any car not reaching maximum battery State Of Charge.

Distribution networks have their limitations for handling renewable resources and intensive energy consuming loads as EVs. First of all, transformer and cables may not be overloaded. Overload will result in reduced asset life times and in increased cost. To identify the influence of flexible devices on overloading conditions it is important that the phase of connection of the household is known. The EN50160 standard also define limits on the voltage level in distribution networks. 95% of the time in a week, the 10 minute mean RMS voltage should be between 90% and 110% of the nominal voltage. And all 10 minute mean RMS voltages should be between 85% and 110% of the nominal voltage. With the introduction of EVs, these limitations might be hard to fulfill without coordinated charging.

In embodiments of the invention, where information on the electricity network would be available a priori, voltages in all nodes of a distribution network can be calculated with a load flow algorithm. For low-voltage distribution networks the backward-forward sweep can for instance be applied. An example of the load flow algorithm can be represented as a nonlinear function of the powers of all customers N.

$$V^m = h(S_1, \ldots, S_N) \quad \text{Eq. 4}$$

Where
$V^m$ is the voltage of node m
$S_i$ is the apparent power of customer i

One can linearize this equation, where the voltage at a specific node can be expressed as:

$$V^m = V^{MV/LV} + \sum_{i=1}^{N} \frac{\partial V^m}{\partial P_i} P_i + \sum_{i=1}^{N} \frac{\partial V^m}{\partial Q_i} Q_i \quad \text{Eq. 5}$$

Where
$V^{MV/LV}$ is the voltage magnitude at the distribution transformer
$P_i$ is the active power of customer i
$Q_i$ is the reactive power of customer i $$\frac{\partial V^m}{\partial P_i}$$

is the influence of active power of customer i on the voltage magnitude of node $V^m$ $$\frac{\partial V^m}{\partial Q_i}$$

is the influence of reactive power of customer i on the voltage magnitude of node $V^m$.

In case the loads would be modeled as current sources the system would behave linearly. Therefore the linearization would not introduce errors due to the superposition principle and Eq. 4 and 5 would be identical. In here, loads are modeled as PQ-sources and therefore linearization errors will occur. We assume that smart meters measure active and reactive power, as well as the voltage magnitude. This data is stored in a database. If multiple time steps are available, an ordinary least squares can be recognized in equation 5 with the partial derivatives as unknowns. If for example the influence on the phase voltage of node 52 needs to be defined, one can solve the following problem:

$$\underset{\frac{\partial V_W^{52}}{\partial P}, \frac{\partial V_W^{52}}{\partial Q}}{\text{minimize}} \left\| V_W^{52} - V_W^{MV/LV} - [P]\frac{\partial V_W^{52}}{\partial P} - [Q]\frac{\partial V_W^{52}}{\partial Q} \right\|_2 \quad \text{Eq. 6}$$

Where
$V_W^{52}$ is a vector with the magnitude of the voltages in phase W of node 52 for different time steps
$V^{MV/LV}$ is a vector with the magnitude of the voltage in phase W at the distribution transformer for different time steps
[P] is a matrix consisting of the active powers for different time steps
[Q] is a matrix consisting of the reactive powers for different time steps $$\frac{\partial V_W^{52}}{\partial P}$$

is a vector with the influences of active power of customers on the voltage magnitude in phase W of node 52

$$\frac{\partial V_W^{52}}{\partial Q}$$

is a vector with the influences of reactive power of customers on the voltage magnitude in phase W of node 52.

Figure 11:
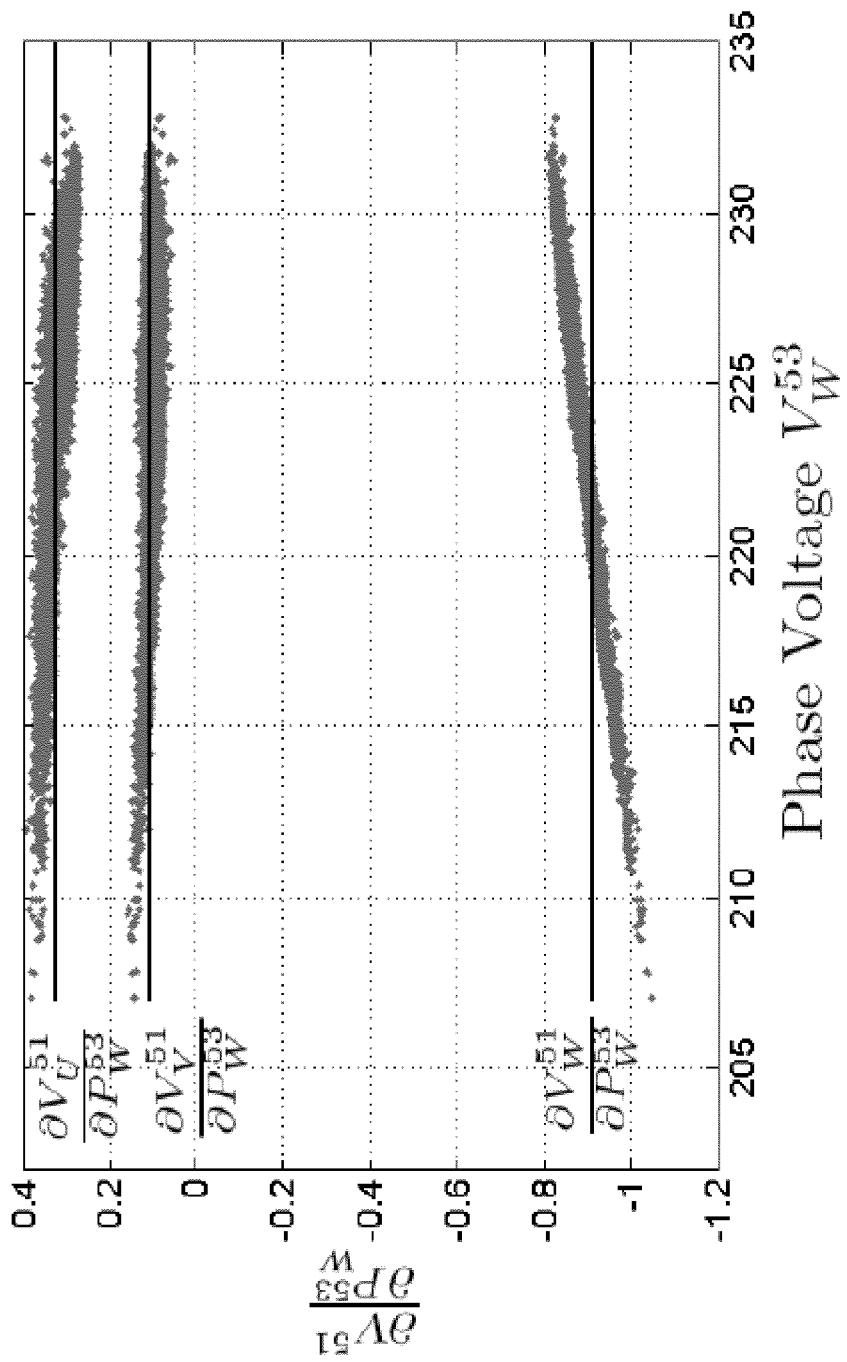
FIG. 11 illustrates the influence of load 53 on the phase voltages of node 51 and the LS estimate of it.

This least squares (LS) method, according to embodiments of the invention, preferably does not require any information about the grid. The partial derivatives obtained by the LS method are constants and can give a measure of the location throughout the grid. The actual derivatives depend on the working point and can be calculated with numerical differentiation in case the grid is known. Results will be compared with the derivatives obtained by numerical differentiation. FIG. 10 shows the obtained partial derivatives for the three phase voltages of node 52 by the least squares method with measurement data of 10000 time steps. Gaussian noise is added to power measurements (=10 VA) and voltage measurements (=0.5 V). FIG. 11 plots the influence of loads in node 53 on the phase voltages of node 51. The partial derivatives obtained by numerical differentiation around the working point are shown by dots and depend on the voltage at the load. The partial derivative obtained by LS is constant and shown as a full line. It can be seen that linearization errors will be made. However, as voltage limitations are evaluated only on a 10 minute base, these errors can be corrected in subsequent time steps if updating of the flexible loads happens more frequently than 10 minutes.

Figure 12:
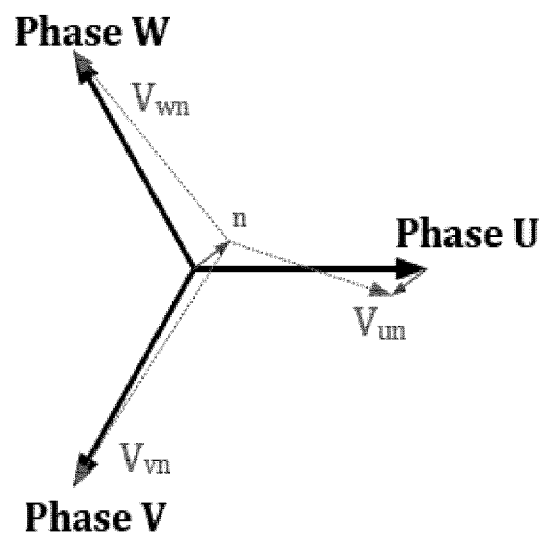
FIG. 12 illustrates a neutral point shift in unbalanced grids.

The partial derivatives can also give information about the phase connection. In case the smart meter that had measured the voltage $V^m$ is connected to the same phase as the household i, the partial derivative $$\frac{\partial V^m}{\partial P_i}$$

will be negative, as the active power has created a voltage drop. On the other hand, when the household is connected on another phase, $$\frac{\partial V^m}{\partial P_i}$$

will have a small positive value. This allows to group all loads that are connected at the same phase, based on the partial derivatives. In FIG. 10 it can be seen that the phase of connection applied to this grid was a sequence of 1, 2, 3, 1, 2, 3, . . . . The positive partial derivatives arise due to the neutral point shift. In case of unbalanced or single phase loads, a current will flow through the neutral conductor, resulting in a voltage drop over its impedance. This will shift the neutral voltage experienced by all customers as shown in FIG. 12. Therefore, when consuming power in one phase, the voltage in this phase will decrease, whereas the voltage in the other two phases will slightly increase. Therefore, in case voltage limitations are reached in one phase, more power consumption in the other two phases will allow a higher consumption in the critical phase.

According to embodiments of the invention, when prior knowledge of the grid is available, this can be included by adding constraints to the LS problem and making it a convex optimization problem. When the order of houses is known, but not the cable lengths or cable type, this can be added to the optimization problem. For example the influence of loads in node 53, 56, 59, 62, 65 and 68 on nodes 40 till 52 must be approximately identical as they are connected on the same phase and the impedance faced by their power between the substation and nodes 40 till 52 is the same. This can be written as:

$$\underset{\frac{\partial V}{\partial P}, \frac{\partial V}{\partial Q}}{\text{minimize}} \left\| V - V_{MV/LV} - [P]\frac{\partial V}{\partial P} - [Q]\frac{\partial V}{\partial Q} \right\|_2$$

subject to $$\frac{\partial V^{52}}{\partial P_{53}} = \frac{\partial V^{52}}{\partial P_{56}}$$

$$\frac{\partial V^{52}}{\partial Q_{53}} = \frac{\partial V^{52}}{\partial Q_{56}}$$

Where
V is a vector with the magnitude of the node voltages for different time steps
$V^{MV/LV}$ is a vector with the magnitude of the voltage at the distribution transformer for different time steps
[P] is a matrix consisting of the active powers for different time steps
[Q] is a matrix consisting of the reactive powers for different time steps $$\frac{\partial V}{\partial P}$$

is a vector with the influences of active power of customers on the voltage magnitude of the nodes in V $$\frac{\partial V}{\partial Q}$$

is a vector with the influences of reactive power of customers on the voltage magnitude of the nodes in V If the phase of connection of some houses is known, this can be added in the optimization problem as follows:

$$\underset{\frac{\partial V}{\partial P}, \frac{\partial V}{\partial Q}}{\text{minimize}} \left\| V - V_{MV/LV} - [P]\frac{\partial V}{\partial P} - [Q]\frac{\partial V}{\partial Q} \right\|_2 \quad \text{Eq. 7}$$

subject to $$\frac{\partial V_W^{52}}{\partial P_{53}} < \frac{\partial V_U^{52}}{\partial P_{53}}$$

$$\frac{\partial V_W^{52}}{\partial P_{53}} < \frac{\partial V_V^{52}}{\partial P_{56}}$$

Prior knowledge can slightly improve the results of the obtained partial derivatives. Based on the obtained phase information and partial derivatives, network limitations are preferably be included in a market based multi-agent control, according to embodiments of the invention. In addition, transformer overloading calculations preferably require phase information or (approximate) voltage profile calculations preferably require grid information. In addition e.g. a DSO for example the Belgian DSO would need grid topology knowledge or extract the latter from for instance smart meter data by e.g. constrained least squares.

In the market based control of an electric network, each possible equilibrium priority preferably results in a consumption level of each device defined by the priority or by the bid function. To include the voltage limitations of the network in the concentrator agent, as indicated earlier, for each possible equilibrium priority a linearized load flow is preferably executed, before sending it to the auctioneer agent or higher level regional concentrator agent. If no constraint violations occur, the different bids can be aggregated or added up for this possible equilibrium priority by a regional concentrator agent. Each device will preferably get the same priority assigned. This is done by checking the following conditions:

$$\sum_{i=1}^{N} \frac{\partial V^m}{\partial P_i}(P_i(\overline{\lambda})) < V_{lim}^m,$$ Eq. 8

$$m = 1, \ldots, M$$

$$\sum_{i=1}^{N} (P_i(\overline{\lambda})) < P_{lim}^{Trafo},$$

phase $U, V, W$

Where $\overline{\lambda}$ is the possible equilibrium priority, $$\frac{\partial V^m}{\partial \cdot P_i \cdot}$$

is the influence of power $P_i$ injected at the point of connection to the grid of device i or node i, on the voltage of all control nodes m that are kept in limits. The partial derivatives are defined by the LS-method. Alternatively, when the grid topology would be known, these could be identified by numerical differentiation. Typically these control nodes m are all the customer nodes. It is assumed that these nodes can communicate their voltages to the concentrator agent or that these voltages can be estimated, so that the margin to the phase voltage limit ($V_{lim}^m$) at all control nodes M when no flexible devices are turned on can be defined.

$P_i(\overline{\lambda})$ is the power that the flexible device i consumes for a given equilibrium priority $\overline{\lambda}$, defined by the bid function. $P_{lim}^{Trafo}$ is the flexible power that can be consumed before the transformer gets overloaded. In case the grid topology would be known exactly, and a load flow algorithm could be executed sufficiently fast, Equation 8 could be replaced by an exact load flow.

As indicated above, according to embodiments of the invention, when violations of Eq. 8 do take place in a specific phase for a possible equilibrium priority the concentrator agent preferably can assign an extra priority to making use of this specific phase. Due to this, for instance the virtual price customers at an overloaded phase will have to pay will be formed by the sum of the equilibrium market virtual price and a resource virtual price. Less loads will consume power in this phase and network undervoltage or transformer overloading can be avoided. The different priorities for resources are stored, so that in case this equilibrium priority for instance is selected by a higher-level regional concentrator agent, the correct priorities for making use of the resources (if any) can be send to the different local agents. FIG. 13 shows a flow-chart illustrating how a regional concentrator agent according to preferred embodiments of the invention preferably works, whereby a regional concentrator takes electricity network constraints into account, before sending the aggregated priority or e.g. aggregated bids to a higher-level regional concentrator agent.

Figure 14:
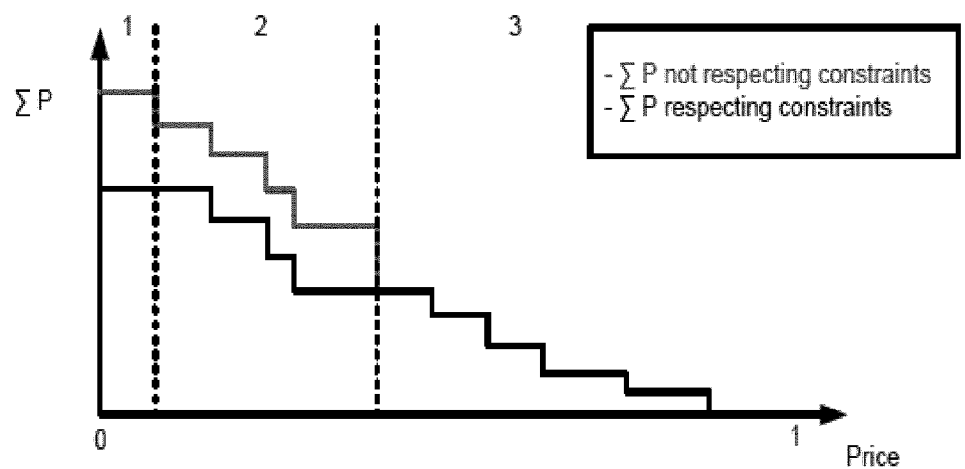
FIG. 14 illustrates summed bid functions respecting network constraints according to embodiments of the invention.

An aggregated priority or bid function of the regional concentrator agent, respecting the network constraints, according to embodiments of the invention is presented in FIG. 14. It typically consists of 3 zones. For high priorities a small amount of power will be consumed, resulting in no undervoltage conditions or transformer overloading, marked with the number 3 on FIG. 14. When priorities are lowered, power consumption of flexible devices increases and voltage violations or transformer overloading will occur. Typically this arises first in only one of the three phases. An extra resource virtual price can for instance be added to this possible equilibrium priorities for customers connected to this phase. This zone is marked with the number 2. For very low market priorities, all phases will be overloaded and different resource virtual prices will be assigned to each phase.

Figure 15:
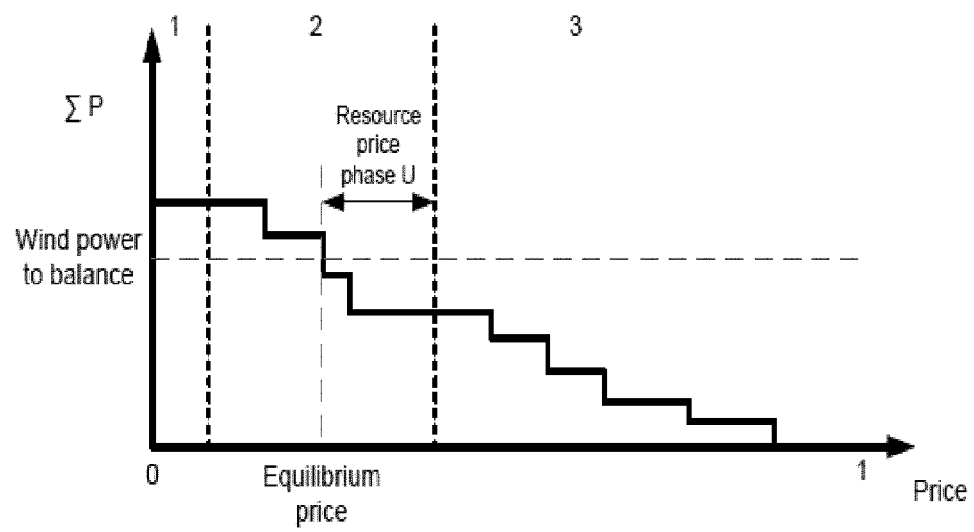
FIG. 15 illustrates defining of an equilibrium price by an auctioneer agent or higher-level regional concentrator agent.

FIG. 15 shows an example where a balancing party wants to consume a certain amount of energy for wind power balancing dependent on the wind energy excess. In a higher-level regional concentrator agent, an equilibrium priority is preferably determined as an intersection of the assembled or aggregated priority and an expected energy consumption of the balancing party 9. As devices with high priority are preferably charged first, energy flexibility is preferably maintained for subsequent time-steps. This equilibrium priority can generate network problems in one phase (i.e. phase U) in case customers of this phase would be charged this equilibrium priority. Therefore, when the concentrator agent receives this equilibrium priority from the higher-level regional concentrator agent, it preferably can add the previous calculated resource price to customers of this phase. The other phases will receive the normal equilibrium market priority.

Figure 16:
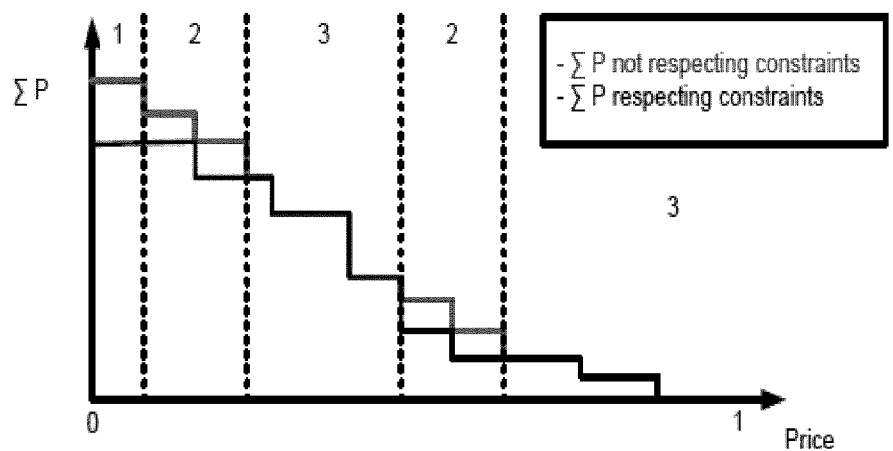
FIG. 16 illustrates a neutral point shift effect in an aggregated bid function according to embodiments of the invention.

When aggregating priority for distributing an energy flow or bid functions, according to embodiments of the invention, sometimes zone 2 can be surrounded by zone 3 at both sides. This means that for some lower supply priorities form the market, customers of a phase sensitive to undervoltage do not have to pay a resource price as for higher market priorities. This is due to the neutral point shift. The voltage in the phase with undervoltage preferably can rise when for lower priorities significantly more power is consumed in the two other phases. This might result in aggregated priorities (e.g. bid curves) as illustrated in FIG. 16.

An algorithm, according to methods of the present invention, is for example tested in simulation where a vehicle fleet is used for wind power balancing. For different penetration levels of EV in the network of FIG. 4, the algorithm is applied. For each penetration level a certain amount of cars are randomly distributed over the grid and assumed to have a single-phase connection. Based on their arrival and departure time, each local agent preferably creates a priority for the EV. Each quarter, priorities are preferably updated. When aggregating these bids, a concentrator agent preferably takes the network constraints into account. Voltage conditions are preferably checked in all customer nodes. A higher-level regional concentrator agent preferably defines an equilibrium priority like illustrated in FIG. 15 where a certain amount of power needs to be absorbed. In preferred embodiments when an equilibrium priority is defined, a concentrator agent preferably can add or subtract a priority, e.g. a priority linked to a resource, if provided as illustrated in FIG. 14.

Figure 17:
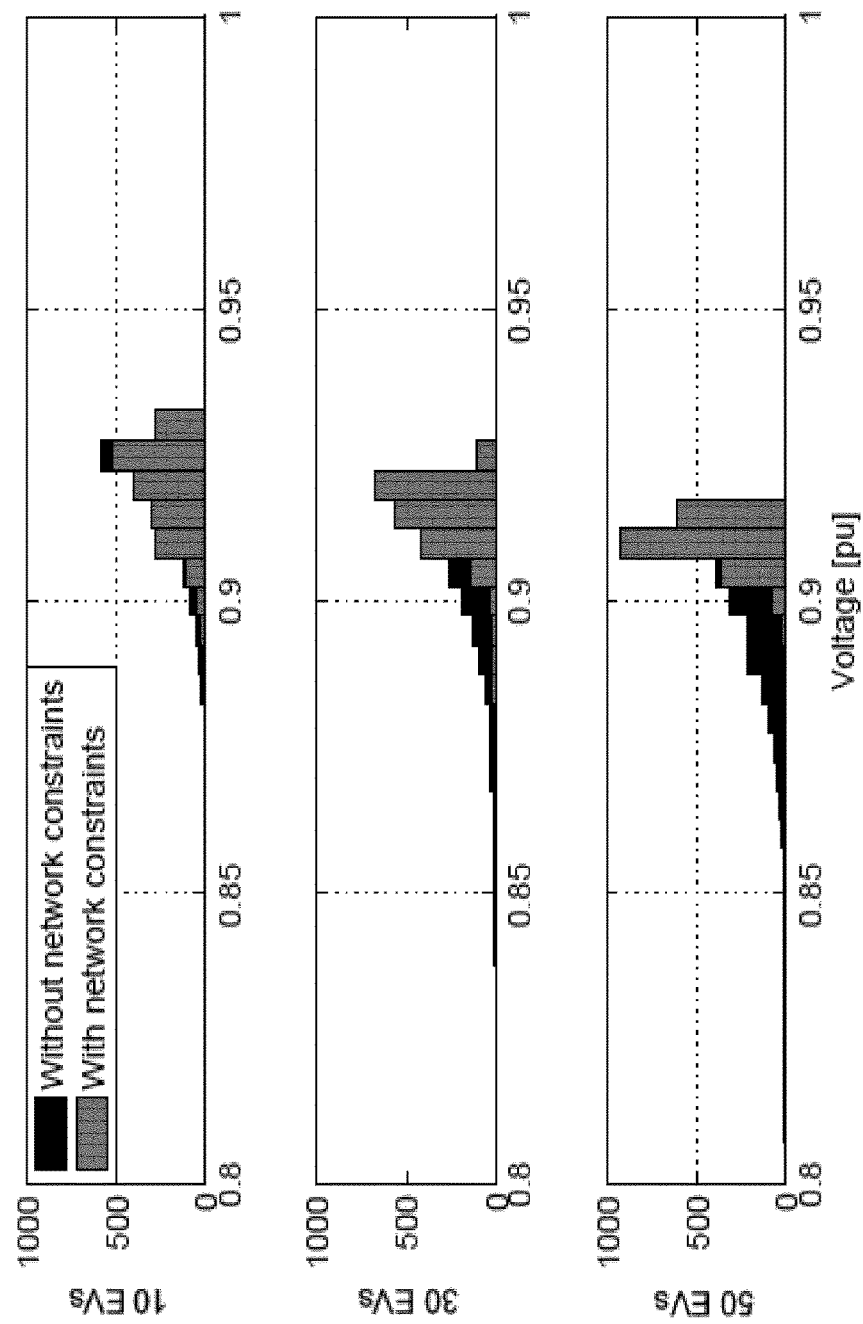
FIG. 17 illustrates a minimum voltage for market based control with and without network constraints.

FIG. 17 compares an algorithm according to embodiments of the invention, with a market based control that does not take into account the network limitations, for different penetration levels of EV. The undervoltage limit is defined to be 0.9 pu. 50 simulations of 1 month are run for each of the three penetration levels with different random assignment of load profiles and EV location. The amount of power that has to be balanced is variable and depends on the penetration level. The 2000 lowest voltages in the grid are shown for each penetration level in this Figure. It can be seen that violations of the grid standards takes less place when network constraints are included in the market based control. Small undervoltage occurs still even when the network constraints are taken into account. Multiple reasons can be given for this effect. First of all undervoltage can occur even without one car charging. The algorithm cannot avoid these conditions, but can only avoid worsening it. Secondly linearization errors are made in 6. These however could be compensated for if an update of the algorithm would occur more frequently then each 10 minutes. Finally, cars that assign a priority of 1, which is a maximal priority, to charging, preferably are charged no matter what. This might violate the voltage limitations, but will guarantee all cars being charged on time.

Preferably embodiments of the present invention provide a multi-agent market based control or distribution of an energy flow, which preferably takes electricity network limitations into account for unknown distribution networks. It is shown that based on smart meter measurements, a phase of connection of a certain household, as well as the influence of the household load on voltages in other nodes advantageously can be identified with ordinary or constrained least-squares, according to embodiments of the invention. The multi-agent market based control is scalable and can be applied to aggregate flexible customer devices in low voltage grids to balance wind power variations. Flexible devices that have higher needs for electricity, and therefore are willing to pay more than others, will receive first the available power. In case no network limitations are active, all devices are equally treated. When network constraint violations might occur in the low voltage grid, devices will be treated differently, dependent on their phase of connection. In that case, the DSO can for instance add a priority for making use of the overloaded phase, increasing the total priority and avoiding network problems. This way voltage problems and transformer overloading can be avoided, while more power can be aggregated.

In embodiments of the invention each node or bus preferably has an associated status in the electricity network 1, comprising a complex voltage, an incoming and outgoing (active and reactive) power. The active and reactive powers can be actual, up-to-date measurement data originating from the nodes with measurement devices known to the person skilled in the art. As an alternative, the numbers can also be simulated data, and, for example, one or more of the aforementioned numbers can be definable as parameters, after which the other shown data are calculated and displayed. Thus, it is possible for a network manager to determine how thick cables and/or lines must be designed and, for example, to observe the behaviour of the network (simulation) if one or more of the generators, loads or cables fail. Power flow or status determinations can also be used to optimize the network management, for example by reducing losses in the network, as a result of which operating costs can be reduced. According to the present invention, the power flow or status determinations can be carried out in a distributed manner, for example with the aid of local pieces of software (agents) which can carry out power flow determinations at a local level (i.e. for each node).

A local agent, which in each case has all local information (measurement or simulation data associated with the respective node) is associated with each node. This contrasts with hitherto known methods, wherein all required information must be available centrally in the electricity network 1. Each agent represents the status of exclusively the associated node, i.e. can calculate or determine the status of the relevant node on the basis of data (estimates or measurement data). The status preferably comprises (just as in conventional power flow calculations) the (complex) voltage on the node, and the incoming or outgoing (complex) power. In each node, some parameters can be known, whereas the remaining parameters are initially estimated, and finally determined. For each region 2, 3 a regional concentrator agent is preferably present or allocated. Each regional network 2, 3 comprises a part of the multiplicity of nodes, and the total of regional networks 2, 3 forms the electricity network 1. The regional agent receives the relevant data, i.e. the results of the status determinations, from the agent associated with the nodes from the relevant region 2, 3. The regional concentrator agent can then carry out a power flow calculation known per se for the region 2, 3 which is limited in extent, but without taking into account the dynamic influence of the one region 2 or the other region 3.

Each regional concentrator agent also can carry out a simplification of the respective regional network 2, 3 and stores this as a simplified network representation of the associated regional network 2, 3, for example even to the level of one single node, or a combination of several nodes (fewer than the total number of nodes in the relevant regional network 2, 3). These data (simplified network topology) can also forwarded to a higher level.

In a further embodiment, the entire process can be iterative, in order to arrive at a stable solution for the status of the entire network 1. The number of layers may be greater than the three layers shown in this example (local agents; regional concentrator agents and higher-order regional concentrator agent). As a result, it is possible to carry out status determination (power flow) for even more complex electricity networks, with still limited means for carrying out the determinations. An optimization of the size of each region 3, 4 can be carried out on the basis of, for example, the available calculating resources.

The iterations can be carried out from the layer of local agents via the regional concentrator agents to the higher-order regional concentrator agent, and back again.

In one embodiment, the agents and regional concentrator agents can be implemented as software (modules, programs) which is executed on a computer system. The computer system preferably comprises a processor, and a memory unit (such as a hard disk and/or semiconductor memory) connected to the processor and an input/output unit (I/O). The input/output unit (I/O) is preferably connected to various peripheral devices. An example of a peripheral device is a read unit to read computer-executable instructions into the memory. The read unit can be designed to read data (such as computer-executable instructions) from and possibly store data on a computer program product, such as a floppy disk or CD-ROM. Other comparable data media may be, for example, memory sticks, DVDs or Blu-ray discs, as known to the person skilled in the art.

The processor in the computer system may be implemented as a standalone system or as a number of parallel-operating processors, each one being designed to execute subroutines of a larger program, or as one or more main processors with various sub-processors.

In one embodiment, the various local agents and regional concentrator agents can be implemented on one central computer system. This can, for example, be applied if the power flow calculations are carried out as a simulation of an existing or future electricity network 1. As an alternative, the local agents and the regional concentrator agents can be implemented on a plurality of computer systems (decentralized), for example in the case where up-to-date measurement values from an electricity network 1 are used (for instance with the use of sensors). In one embodiment, the input/output unit is an interface for the exchange of data with one or more sensors (as a further example of the peripheral devices which are to be connected to the input/output unit). The sensors can measure voltage, current and/or other operational parameters associated with a node. These measurement data can be used in the embodiments described herein.

Decentralized processing (for example via a computer network) can also be used in simulations of electricity networks. As a further alternative, determinations can be carried out in parallel by two or more of the local agents, regional concentrator agents and the higher-order regional concentrator agent, for example on a computer system that is suitable for parallel execution of software. This results in a time gain, through the distribution of intrinsically complex calculations among a plurality of (physical or virtual) processors.

In embodiments, one or more of the local agents, regional concentrator agents and the higher-order regional concentrator agent can be implemented as an autonomous unit. An autonomous unit of this type is autonomously capable of carrying out local calculations, independently from other agents in the same or a different layer.

The distributing device as described with reference to various embodiments may be a part of a node in the electricity network 1, and may, for example, be implemented as an embedded system.

According to embodiments of the present invention the flow of energy may be any flow of energy deemed appropriate by the person skilled in the art but preferably is a flow of electric energy, more preferably over a smart grid e.g. using demand side management (DSM).

According to preferred embodiments of the current invention, the constraints relating to energy comprise the availability of the energy. In such an embodiment the demand for energy by the nodes, grouped in clusters, can be balanced with the supply of energy and it has been found that a more continuous flow of energy can be obtained which is important for, for example, electricity. The constraints relating to energy can also comprise, instead or in addition, any one of: the desired frequency and/or voltage of electricity on a power grid for stabilizing the flow of electric energy on the power grid the power grid being in such case the flow of energy, environmental factors relating to the flow of energy such that environmental factors can be taken into account, etc.

According to preferred embodiments of the current invention, the constraints relating to energy can comprise the price of the energy. In such an embodiment the price paid for the energy can be minimized such that the users of the nodes pay less for a same amount of energy. Such a method is especially preferred in combination with constraints relating to energy comprise the availability of the energy as the price for energy usually is correlated to the amount of available energy, especially with electrical energy.

According to preferred embodiments of the current invention, the energy is electrical energy as for such energy the constraints can vary significantly over time.

A node can comprise a cluster, whereby said cluster can comprise many different devices or can comprise substantially one sort of device. For example, the cluster can group together the devices of a household, different households of for example a block of houses, etc. the cluster in such case grouping together household devices. The cluster however can also group together devices such as for example electric cars, electric heaters, etc. Although the cluster can group together similar devices into a cluster it can also comprise several substantially different devices such as for example industrial devices with substantially different energy requirements. Although many of the examples of the devices given above are devices which need energy to provide work, the cluster can also comprise devices which provide energy from work, i.e. devices producing energy such as for example wind turbines, combined heat and power devices, photovoltaic electrical energy devices, etc. For such devices the power has an opposing sign as the power for devices which need energy to work such that minimal and maximal amount of power intake allowed by the devices can also be worded as the minimal and maximal amount of power, with opposing sign as previously mentioned, output. Any number of devices can be grouped into a cluster of devices such as for example two devices, three devices, four devices, five devices, six devices, etc. depending on the requirements of the person skilled in the art. However, preferably the minimum amount of devices of the cluster is 20, although the method is suitable for handling large numbers of devices in a cluster such as for example 100 000 or more. However, when increasing the amount of devices, the time needed to perform certain steps such as for example step 2 increases, more in particular linearly. Therefore, it is preferred that the number of devices grouped in a cluster does not excessively increases the time needed for certain steps of the method according to the invention. The cluster of devices comprises devices actually connected to the flow of energy and/or comprises devices which during the predetermined time are initially not connected to the flow of energy but are connected to the flow of energy during the predetermined period of time. The cluster can for example comprise a group of electrical cars to be charged some of which are connected to the flow of energy at the beginning of the predetermined period of time, others connected to the flow of energy during the predetermined period of time, for example in a garage upon arrival. The constraints can be any constraints, such as for example availability, price of the energy, the availability possibly being reflected in the price of the energy, the maximum amount of energy which can flow over a certain connection from the devices of the cluster to the flow of energy, for example for electrical energy taking for example the occurrence of an overcurrent into account, a maximal power which can be delivered to the cluster, for example if the flow of energy if delivered to the cluster over an electrical transformer, etc. It is also not required that the respective devices of the cluster are as a group interconnected to the flow of energy using a single line for providing the flow of energy to the different devices of the cluster, such as for example often in a single household, each respective device can be connected to the flow of energy independently from the other devices.

It is to be understood that this invention is not limited to the particular features of the means and/or the process steps of the methods described as such means and methods may vary. It is also to be understood that the terminology used herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

The invention claimed is:

1. A method for distributing and/or controlling an energy flow to a cluster of a plurality of nodes in an electricity network, wherein each node has an associated status, taking into account constraints relating to the energy to be delivered to the nodes and taking into account constraints relating to the electricity network, comprising the steps of:
    allocating a local agent to each node of the cluster of a plurality of nodes, wherein the local agent receives a priority for energy to be delivered among the nodes;
    allocating at least one regional concentrator agent to at least one regional network, wherein the at least one regional network comprises at least a part of the cluster and wherein a total of the at least one regional network forms the electricity network;
    receiving by the at least one regional concentrator agent, the priority for energy to be delivered among the nodes and determining an aggregate priority for energy to be delivered to the at least one regional network, wherein said aggregate priority depends on voltage limitations of the electricity network, and
    determining an equilibrium priority, by intersection of the aggregate priority for energy to be supplied and a supply priority for energy to be supplied by a market, by a higher-level regional concentrator agent,
    further comprising receiving said equilibrium priority by the local agent, wherein said local agent allocated to the node controls a power consumption and/or distribution of the node, based on the equilibrium priority.

2. Method for distributing and/or controlling an energy flow according to claim 1, wherein the method further comprises receiving, by the higher-level regional concentrator agent, the aggregate priority for energy to be delivered to the at least one regional network and a supply priority for energy to be supplied.

3. Method for distributing and/or controlling an energy flow according to claim 1, wherein the method further comprises receiving the equilibrium priority by the at least one regional concentrator agent.

4. Method for distributing and/or controlling an energy flow according to claim 1, whereby said controlling a power consumption and/or distribution of the node comprises assigning an amended priority for said node, based on the equilibrium priority.

5. Method for distributing and/or controlling an energy flow according to claim 1, wherein said controlling a power consumption and/or distribution of the node comprises assigning an amended priority for said node, based on the equilibrium priority.

6. Method for distributing and/or controlling an energy flow according to claim 1, wherein the associated status of each node comprises a complex voltage, an incoming and/or outcoming power.

7. Method for distributing and/or controlling an energy flow according to claim 1, wherein said associated status provides voltage limitations of the electricity network.

8. Method for distributing and/or controlling an energy flow according to claim 1, wherein said associated status is measured and/or a priori available and/or estimated.

9. Method for distributing and/or controlling an energy flow according to claim 6, wherein said complex voltage comprises a phase and wherein said phase of a connection with the electricity network is identified by a least-squares approach.

10. Method for distributing and/or controlling an energy flow according to claim 1, further comprising the step of identifying influence of flexible loads at one location on the electricity network, on the voltage of another location on the electricity network.

11. Method for distributing and/or controlling an energy flow according to claim 1, whereby said priority for energy to be delivered describes a relation between power consumption of a node and priority.

12. A method for distributing and/or controlling an energy flow to a cluster of a plurality of nodes in an electricity network, wherein each node has an associated status, taking into account constraints relating to the energy to be delivered to the nodes and taking into account constraints relating to the electricity network, comprising the steps of:
    allocating a local agent to each node of the cluster of a plurality of nodes, wherein the local agent receives a priority for energy to be delivered among the nodes;
    allocating at least one regional concentrator agent to at least one regional network, wherein the at least one regional network comprises at least a part of the cluster and wherein a total of the at least one regional network forms the electricity network;
    receiving by the at least one regional concentrator agent, the priority for energy to be delivered among the nodes and determining an aggregate priority for energy to be delivered to the at least one regional network, wherein said aggregate priority depends on voltage limitations of the electricity network,
    wherein the priority for energy to be delivered to be supplied is determined as power in function of priority such that minimal priority corresponds to a maximum amount of power intake allowed by a respective device and a maximal priority corresponds to a minimum amount of power intake allowed by the respective device, a relation between power and priority being indicative of a minimal amount of energy needed by the device in a predetermined amount of time and the relation between power and priority changing in function of time, and
    determining an equilibrium priority by intersection of the aggregate priority for energy to be supplied and a supply priority for energy to be supplied by a market, by a higher-level regional concentrator agent, further comprising receiving said equilibrium priority by the local agent, wherein said local agent allocated to the node controls a power consumption and/or distribution of the node, based on the equilibrium priority.

13. A method for distributing and/or controlling an energy flow to a cluster of a plurality of nodes in an electricity network, wherein each node has an associated status, taking into account constraints relating to the energy to be delivered to the nodes and taking into account constraints relating to the electricity network, comprising the steps of:

allocating a local agent to each node of the cluster of a plurality of nodes, wherein the local agent receives a priority for energy to be delivered among the nodes;

allocating at least one regional concentrator agent to at least one regional network, wherein the at least one regional network comprises at least a part of the cluster and wherein a total of the at least one regional network forms the electricity network;

receiving by the at least one regional concentrator agent, the priority for energy to be delivered among the nodes and determining an aggregate priority for energy to be delivered to the at least one regional network, wherein said aggregate priority depends on voltage limitations of the electricity network;

aggregating flexibility information for the cluster by gathering flexibility information of respective nodes in the cluster, the flexibility information of the respective nodes comprising information on energy already available to respective devices, a minimal amount of accumulated energy in function of time needed and a maximal amount of accumulated energy allowed by the respective nodes of the cluster within a predetermined period of time in function of time and a minimal and a maximal amount of power intake allowed by the devices, and combining the gathered flexibility information of the respective nodes of the cluster into aggregate flexibility information for the cluster, the aggregate flexibility information of the cluster comprising information on the energy already available to the cluster, the minimal amount of accumulated energy in function of time needed and the maximal amount of accumulated energy in function of time allowed by the cluster, taking into account the minimal amount of accumulated energy in function of time needed and the maximal amount of accumulated energy in function of time allowed by the at least one node within the predetermined period of time in function of time, within the predetermined period of time in function of time and on the minimal and the maximal amount of power intake allowed by the cluster in function of time, taking into account the minimal and the maximal amount of power intake allowed by the nodes, determining accumulated energy to be delivered to the cluster in function of time over the predetermined period of time taking into account the aggregate flexibility information for the cluster, and supplying the determined accumulated energy to the cluster by obtaining, from the flow of energy, power to be supplied to the cluster in function of time based on the determined accumulated energy to be delivered in function of time, determining for all devices in the cluster a priority for power to be supplied.

14. A system for distributing and/or controlling an energy flow to a cluster of a plurality of nodes in an electricity network, wherein each node has an associated status, taking into account constraints relating to the energy to be delivered to the nodes and taking into account constraints relating to the electricity network, wherein the system comprises a local agent and a regional concentrator agent adapted to perform a method comprising the steps of:

allocating a local agent to each node of the cluster of a plurality of nodes, wherein the local agent receives a priority for energy to be delivered among the nodes;

allocating at least one regional concentrator agent to at least one regional network, wherein the at least one regional network comprises at least a part of the cluster and wherein a total of the at least one regional network forms the electricity network;

receiving by the at least one regional concentrator agent, the priority for energy to be delivered among the nodes and determining an aggregate priority for energy to be delivered to the at least one regional network, wherein said aggregate priority depends on voltage limitations of the electricity network, determining an equilibrium priority, by intersection of the aggregate priority for energy to be supplied and a supply priority for energy to be supplied by a market, by a higher-level regional concentrator agent, and further comprising receiving said equilibrium priority by the local agent, wherein said local agent allocated to the node controls a power consumption and/or distribution of the node, based on the equilibrium priority.

15. System for distributing and/or controlling an energy flow to a cluster of a plurality of nodes in an electricity network according to claim 14, further provided with an interface to receive measurement data.

16. System for distributing and/or controlling an energy flow to a cluster of a plurality of nodes in an electricity network according to claim 14, wherein said system is part of a node in the electricity network.

* * * * *